(12) United States Patent
Zhang et al.

(10) Patent No.: US 10,655,975 B2
(45) Date of Patent: May 19, 2020

(54) SYSTEM AND METHOD FOR ROUTING OPTIMIZATION

(71) Applicant: ALIBABA GROUP HOLDING LIMITED, Grand Cayman (KY)

(72) Inventors: Xingwen Zhang, San Mateo, CA (US); Hao Lu, San Mateo, CA (US); Zhigang Hua, San Mateo, CA (US); Shuang Yang, San Mateo, CA (US)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 16/722,533

(22) Filed: Dec. 20, 2019

(65) Prior Publication Data

US 2020/0124429 A1 Apr. 23, 2020

Related U.S. Application Data

(63) Continuation of application No. PCT/US2019/052465, filed on Sep. 23, 2019.

(51) Int. Cl.
  *G01C 21/00* (2006.01)
  *G01C 21/34* (2006.01)
  (Continued)

(52) U.S. Cl.
  CPC ..... *G01C 21/3453* (2013.01); *G01C 21/3415* (2013.01); *G06K 9/6262* (2013.01); *G06N 20/00* (2019.01); *G06Q 10/047* (2013.01)

(58) Field of Classification Search
  CPC ............ G01C 21/3453; G01C 21/3415; G06Q 10/047; G06K 9/6262; G06N 20/00
  See application file for complete search history.

(56) References Cited

U.S. PATENT DOCUMENTS 6,067,502 A * 5/2000 Hayashida ........... G01C 21/367
  340/990
6,665,651 B2 * 12/2003 Young ................. G05B 13/027
  706/16

(Continued)

OTHER PUBLICATIONS

Chen et al., "Learning to Perform Local Rewriting for Combinatorial Optimization," NeurIPS 2019, arXiv:1810.00337 v4, May 24, 2019, 19 pages.

(Continued)

*Primary Examiner* — Khoi H Tran
*Assistant Examiner* — Jorge O Peche
(74) *Attorney, Agent, or Firm* — Sheppard Mullin Richter & Hampton LLP

(57) ABSTRACT

Methods, systems, and apparatus, including computer programs encoded on computer storage media, for determining routing using reinforcement learning (RL) are provided. One of the methods includes: initializing a state of an RL model based on a routing solution, wherein the RL model comprises a plurality of improvement actions for applying to the state; applying one or more of the plurality of improvement actions to the state to obtain updated routing solutions until a predetermined condition is satisfied; applying a perturbation action to obtain a perturbed routing solution and feeding the perturbed routing solution back to the RL model for the RL model to perform the applying one or more of the plurality of improvement actions according to the policy; and determining a routing solution with a minimum cost from the updated routing solutions.

20 Claims, 13 Drawing Sheets

(51) Int. Cl.
*G06Q 10/04* (2012.01)
*G06N 20/00* (2019.01)
*G06K 9/62* (2006.01)

(56) References Cited

U.S. PATENT DOCUMENTS

| | | | | |
|---|---|---|---|---|
| 8,612,107 | B2* | 12/2013 | Malikopoulos | B60W 30/1882 701/101 |
| 8,989,943 | B2* | 3/2015 | You | G05D 1/0297 701/23 |
| 9,776,512 | B2* | 10/2017 | Netzer | H04W 4/44 |
| 10,126,749 | B2* | 11/2018 | Rander | B60N 2/0244 |
| 10,321,870 | B2* | 6/2019 | Nevo | A61B 5/165 |
| 2014/0046585 | A1* | 2/2014 | Morris, IV | G01C 21/00 701/468 |
| 2017/0337682 | A1* | 11/2017 | Liao | G06T 7/30 |
| 2018/0247191 | A1* | 8/2018 | Katz | G06Q 20/065 |
| 2018/0292520 | A1* | 10/2018 | Bermudez | G08B 25/08 |
| 2019/0049957 | A1* | 2/2019 | Healey | G01C 21/3484 |
| 2019/0050948 | A1* | 2/2019 | Perry | G06K 9/00657 |
| 2019/0072959 | A1* | 3/2019 | Palanisamy | G06N 3/0454 |
| 2019/0184561 | A1* | 6/2019 | Yip | B25J 9/1666 |
| 2019/0186939 | A1* | 6/2019 | Cox | G05D 1/0088 |
| 2019/0188571 | A1* | 6/2019 | Conti | G06N 3/04 |
| 2019/0228309 | A1* | 7/2019 | Yu | G05B 13/0265 |
| 2019/0291726 | A1* | 9/2019 | Shalev-Shwartz | B60W 10/18 |
| 2019/0291727 | A1* | 9/2019 | Shalev-Shwartz | G07C 5/02 |
| 2019/0291728 | A1* | 9/2019 | Shalev-Shwartz | B60W 30/0953 |
| 2019/0369637 | A1* | 12/2019 | Shalev-Shwartz | G05D 1/0214 |
| 2020/0031371 | A1* | 1/2020 | Soliman | B60W 10/04 |
| 2020/0033869 | A1* | 1/2020 | Palanisamy | G05D 1/0088 |

OTHER PUBLICATIONS

Kool et al., "Attention, Learn to Solve Routing Problems!," Published as a conference paper at ICLR 2019, arXiv:1803.08475 v3, Feb. 7, 2019, 25 pages.

Nazari et al., "Reinforcement Learning for Solving the Vehicle Routing Problem," 32nd Conference on Neural Information Processing Systems (NeurIPS 2018), Montréal, Canada, 11 pages.

Traveling Salesman Problem, published Dec. 27, 2019, available at https://developers.google.com/optimization/routing/tsp, 22 pages.

Vehicle Routing Problem, published Jan. 8, 2020, available at https://developers.google.com/optimization/routing/vrp, 23 pages.

* cited by examiner

1000

1010: initializing a state of an RL model based on a routing solution comprising one or more routes for routing one or more vehicles through a plurality of locations, wherein the RL model comprises a plurality of improvement actions for applying to the state according to a policy to reduce a cost of the routing solution

1020: applying one or more of the plurality of improvement actions to the state according to the policy to reduce the cost of the routing solution and to obtain updated routing solutions until a predetermined condition is satisfied

1030: in response to the predetermined condition being satisfied, applying a perturbation action to obtain a perturbed routing solution and feeding the perturbed routing solution back to the RL model for the RL model to apply one or more of the plurality of improvement actions according to the policy to further reduce the cost of the routing solution

1040: determining a second routing solution with a minimum cost from the updated routing solutions

FIG. 10

SYSTEM AND METHOD FOR ROUTING OPTIMIZATION

CROSS REFERENCE TO RELATED APPLICATION

The present application is a continuation application of International Patent Application No. PCT/US19/52465, filed on Sep. 23, 2019, and entitled "SYSTEM AND METHOD FOR ROUTING OPTIMIZATION", the entire contents of which are incorporated herein by reference.

TECHNICAL FIELD

This application generally relates to systems and methods for determining routing and, in particular, to systems and methods for determining routing using reinforcement learning (RL).

BACKGROUND

Routing optimization may aim to identify a routing solution with optimal cost from a finite set of candidates. The classic traveling salesman problem (TSP) and vehicle routing problem (VRP) are some examples of variants to the routing optimization problem. Real-world applications of routing optimization may be found in areas such as telecommunications network design, task scheduling, transportation system planning, energy, finance, and supply chain. Routing optimization problems involving finding efficient routes for vehicles are commonly referred to as vehicle routing problems (VRP). There are several variants of VRP, such as VRP with pickup and delivery (VRPPD), VRP with Last-In-First-Out, VRP with Time Windows (VRPTW), and Capacitated VRP.

In a typical routing optimization situation, one or more optimal routes (e.g., shortest-distance routes) that pass through each of N given locations need to be identified. It has been challenging to identify the optimal routes because even for a small value of N, the total number of candidate routes is exceedingly large. It has been well-established that determining the optimal solution to VRP is NP-hard. In practice, it is often impossible to test every possible candidate route through trial and error due to constraints on resources, time, etc. Thus, it is desirable to provide a method for determining routing with a shorter time and a greater accuracy.

SUMMARY

Various embodiments of the specification include, but are not limited to, systems, methods, and non-transitory computer readable media for determining routing.

According to some embodiments, a computer-implemented method for determining routing using reinforcement learning (RL) comprises initializing a state of an RL model based on a routing solution comprising one or more routes for routing one or more vehicles through a plurality of locations, wherein the RL model comprises a plurality of improvement actions for applying to the state according to a policy to reduce a cost of the routing solution; applying one or more of the plurality of improvement actions to the state according to the policy to reduce the cost of the routing solution and to obtain updated routing solutions until a predetermined condition is satisfied; in response to the predetermined condition being satisfied, applying a perturbation action to obtain a perturbed routing solution and feeding the perturbed routing solution back to the RL model for the RL model to perform the applying one or more of the plurality of improvement actions according to the policy; and determining a routing solution with a minimum cost from the updated routing solutions.

In some embodiments, the plurality of improvement actions for applying to the state according to the policy to reduce the cost of the routing solution comprise one or more of the following: changing an order of at least two of the plurality of locations in one of the one or more routes; and moving a location from one of the one or more routes to another one of the one or more routes.

In some embodiments, applying the perturbation action comprises one or more of the following: shuffling at least two of the plurality of locations among at least two of the routes; concatenating at least two of the routes; and breaking at least one of the routes into multiple routes.

In some embodiments, each of the updated routing solutions is subject to one or more constraints, the constraints comprising one or more of the following: time constraint; travel distance constraint; vehicle capacity constraint; and power expense constraint.

In some embodiments, each of the plurality of locations is associated with one or more features comprising one or more of the following: position information; demand information; position information of one or more neighboring locations along a corresponding route of the one or more routes; and a remaining capacity of a vehicle leaving the each of the plurality of locations.

In some embodiments, the state comprises the one or more features associated with the plurality of locations.

In some embodiments, the state comprises information of one or more improvement actions previously applied to the state.

In some embodiments, the method further comprises adjusting the policy based on a reward received by applying one or more of the plurality of improvement actions, wherein the reward is calculated based on cost changes after applying the one or more improvement actions.

In some embodiments, the reward for applying the one or more improvement actions is a predetermined positive number if the one or more improvement actions reduce the cost of the routing solution or a predetermined negative number if the one or more improvement actions do not reduce the cost of the routing solution.

In some embodiments, applying the one or more of the plurality of improvement actions to the state before applying the perturbation action corresponds to a first iteration; and the reward for applying the one or more improvement actions in an i-th iteration comprises a difference between a prior total cost reduction of a prior iteration and a total cost reduction of the i-th iteration.

In some embodiments, the improvement action comprises an operation or a no-operation.

In some embodiments, the predetermined condition comprises that the cost of the routing solution fails to reduce after a threshold number of consecutive improvement actions are applied to the state.

In some embodiments, initializing the state of the RL model comprises: for each of a plurality of RL models comprising the RL model, initializing the state of the each RL model based on the routing solution, wherein the each RL model comprises a plurality of improvement actions for applying to the state according to a policy to reduce a cost of the routing solution; applying the one or more of the plurality of improvement actions to the state comprises: for each of the plurality of RL models, applying the one or more of the plurality of improvement actions to the state according to the policy to reduce the cost of the routing solution and to obtain the updated routing solutions until the predetermined condition is satisfied, wherein the state comprises information of a number of improvement actions previously applied to the state, and wherein the number of improvement actions is different for each of the plurality of RL models; applying the perturbation action to obtain the perturbed routing solution and feeding the perturbed routing solution back to the RL model comprises: for each of the plurality of RL models, applying the perturbation action to obtain the perturbed routing solution and feeding the perturbed routing solution back to the each RL model for the each RL model to perform the applying one or more of the plurality of improvement actions according to the policy; and determining the routing solution with the minimum cost from the updated routing solutions comprises: determining the routing solution with the minimum cost from the updated routing solutions obtained for the plurality of RL models.

In some embodiments, the plurality of RL models comprise N RL models each referred to as a j-th model, with j being 1, 2, 3, . . . , or N; and the state of the j-th RL model comprises information of (j−1) improvement actions previously applied to the state.

In some embodiments, the method comprises iteratively performing the applying one or more of the plurality of improvement actions to the state, and in response to the predetermined condition being satisfied, the applying the perturbation action to obtain the perturbed routing and feeding the perturbed routing solution back to the RL model until an exit condition is met.

According to other embodiments, a system for determining routing using reinforcement learning (RL) comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for determining routing using reinforcement learning (RL) comprises a plurality of modules for performing the method of any of the preceding embodiments.

According to some embodiments, a system for determining routing using reinforcement learning (RL) comprises one or more processors and one or more non-transitory computer readable storage media storing instructions executable by the one or more processors to cause the one or more processors to perform operations comprising: initializing a state of an RL model based on a routing solution comprising one or more routes for routing one or more vehicles through a plurality of locations, wherein the RL model comprises a plurality of improvement actions for applying to the state according to a policy to reduce a cost of the routing solution; applying one or more of the plurality of improvement actions to the state according to the policy to reduce the cost of the routing solution and to obtain updated routing solutions until a predetermined condition is satisfied; in response to the predetermined condition being satisfied, applying a perturbation action to obtain a perturbed routing solution and feeding the perturbed routing solution back to the RL model for the RL model to perform the applying one or more of the plurality of improvement actions according to the policy; and determining a routing solution with a minimum cost from the updated routing solutions.

According to other embodiments, a non-transitory computer-readable storage medium is configured with instructions executable by one or more processors to cause the one or more processors to perform operations comprising: initializing a state of an RL model based on a routing solution comprising one or more routes for routing one or more vehicles through a plurality of locations, wherein the RL model comprises a plurality of improvement actions for applying to the state according to a policy to reduce a cost of the routing solution; applying one or more of the plurality of improvement actions to the state according to the policy to reduce the cost of the routing solution and to obtain updated routing solutions until a predetermined condition is satisfied; in response to the predetermined condition being satisfied, applying a perturbation action to obtain a perturbed routing solution and feeding the perturbed routing solution back to the RL model for the RL model to perform the applying one or more of the plurality of improvement actions according to the policy; and determining a routing solution with a minimum cost from the updated routing solutions.

According to yet other embodiments, an apparatus for determining routing using reinforcement learning (RL) comprises an initializing module for initializing a state of an RL model based on a routing solution comprising one or more routes for routing one or more vehicles through a plurality of locations, wherein the RL model comprises a plurality of improvement actions for applying to the state according to a policy to reduce a cost of the routing solution; an applying module for applying one or more of the plurality of improvement actions to the state according to the policy to reduce the cost of the routing solution and to obtain updated routing solutions until a predetermined condition is satisfied; a perturbing module for, in response to the predetermined condition being satisfied, applying a perturbation action to obtain a perturbed routing solution and feeding the perturbed routing solution back to the RL model for the RL model to perform the applying one or more of the plurality of improvement actions according to the policy; and a determining module for determining a routing solution with a minimum cost from the updated routing solutions.

Embodiments disclosed herein have one or more technical effects. In some embodiments, the methods and systems incorporate both heuristics and reinforcement learning (RL) to determine routing. By combining heuristics and RL, the methods and systems disclosed herein provide a black-box heuristic solution that may generate a high-quality routing solution within a reasonable amount of time. In one embodiment, the heuristic actions for providing effective local optimization are combined with the RL framework for learning a policy on taking the heuristic actions to maximize a cumulative reward. In one embodiment, the policy of the RL may be learned against multiple problem instances so that it can react properly to various different routing requests. In other embodiments, the methods and systems disclosed herein may train multiple RL models by using different state representations. The different state representations cause the multiple policies of the multiple RL models to have different emphases when suggesting actions to take. By using multiple RL models for one routing optimization instance, the best routing solution can be selected from all the candidate solutions identified by the multiple RL models, thus improving routing optimization accuracy from end-to-end RL model using one policy with singular focus. In one embodiment, since the multiple RL models may run in parallel, the response time of such methods and systems is much shorter than only using one RL model. In still other embodiments, the methods and systems use RL models to separate heuristic operations or actions into different categories such as improvement actions and perturbation actions. With such separation, policy collapses resulted from directly applying RL on the mixed actions may be avoided. In one embodiment, since the actions are categorized, the methods and systems disclosed herein can use multiple RL models to learn multiple policies targeting the applications of actions of different categories. For example, one RL model targets the application of the improvement actions, and another RL model targets the application of the perturbation actions. In yet other embodiments, the methods and systems disclosed herein obviate the supply of optimal solutions (which are difficult to obtain) to train the model as required in supervised learning.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 10 illustrates a flowchart of a method for determining routing in accordance with some embodiments.

DETAILED DESCRIPTION

Figure 1:
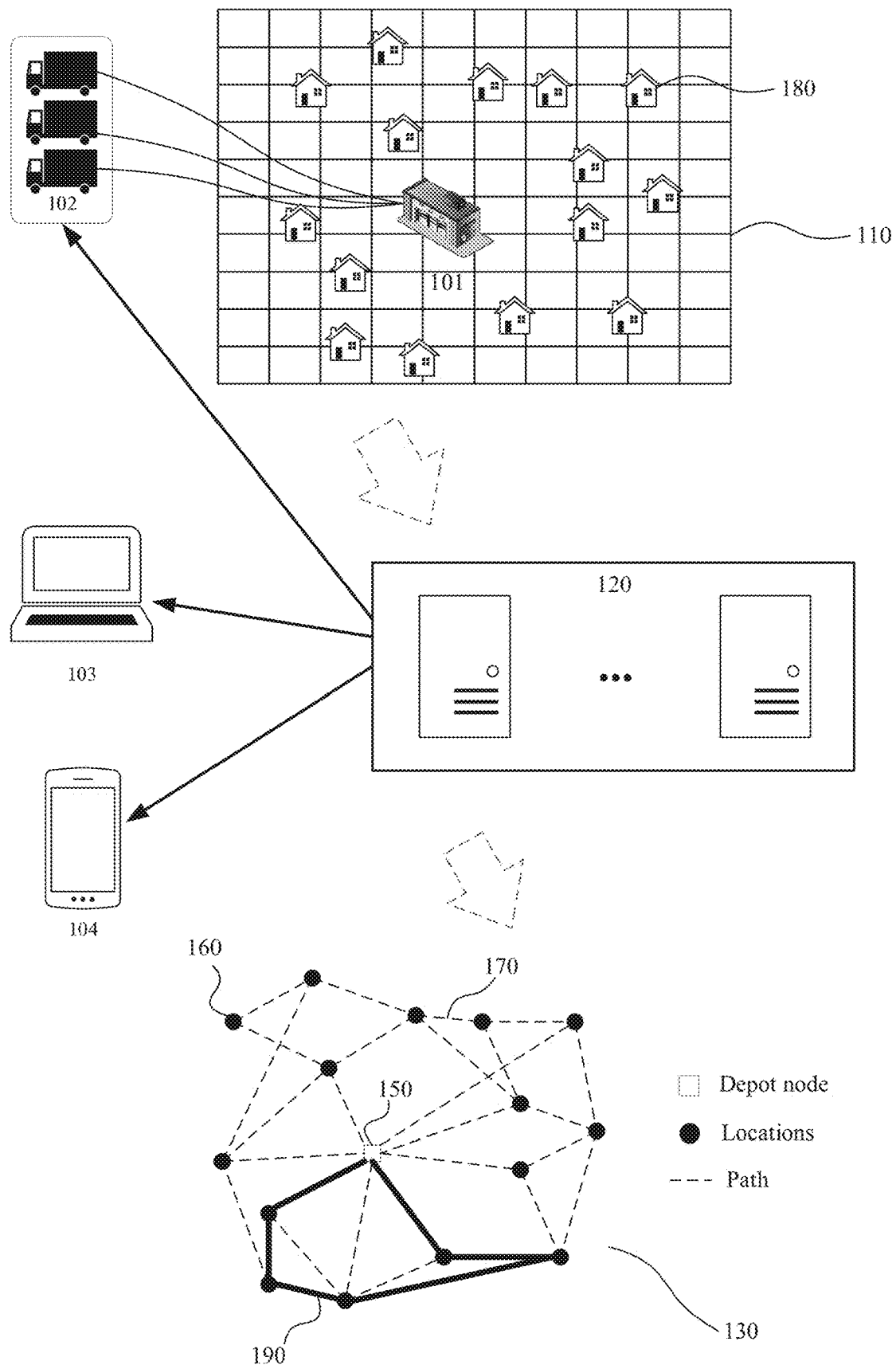
FIG. 1 illustrates an environment associated with a routing problem or its variant instance in accordance with some embodiments.

Traditionally, heuristics are used to explore for the optimal routing solution due to the size and frequency of real-world vehicle routing problems that need to solve. The framework of heuristic algorithms such as the classic hill-climbing approach merely perturbate a candidate solution in repetition until convergence. However, merely perturbing candidate solutions is time-consuming and limits the applicability of heuristic algorithms in real life scenarios. Some other current works focus on training end-to-end frameworks for solving TSP, VRP, and other combinatorial problems based on supervised machine learning algorithms. However, supervised learning requires optimal solutions for instances of the same VRP family in order to train the model, and the optimal solutions usually are difficult to obtain.

Embodiments described herein provide methods, systems, and apparatus for effectively incorporating heuristics and RL for determining routing. The determined optimal routing solution may be provided as navigation to one or more vehicles for visiting a plurality of locations in an area. The vehicles may include cars, trucks, trains, boats, airplanes, etc. The vehicles may visit the locations for various purposes, such as picking up and/or delivering goods and/or passengers. The locations may be connected by roads, highways, air routes, waterways, or the like for routing the vehicles. In some embodiments, an optimal routing solution for an instance (VRP or its variant) in an environment may be obtained. For example, the environment may be a community, a city, a state, a country, or another suitable geographic area. A routing solution in such environment may include a collection of routes for the vehicles to travel along. Traveling along each route may incur a traveling cost.

The routing solution may be subject to a threshold (e.g., a budget) for the cost and may be subject to certain constraints, such as time, travel distance, vehicle weight, size, range, another constraint, or any combination thereof. Optimizing the routing solution may comprise minimizing the cost, while complying with the constraints. Both the traveling cost and constraints may be instance-specific. In a business setting, a service provider may, based on an optimal routing solution corresponding to the environment, plan estimated delivery time, dispatch service vehicles, or assign routes for delivery vehicles accordingly. For instance, a logistics company may need to move a number of goods from one or more pickup locations to one or more delivery locations, with a goal of finding optimal routes for a fleet of vehicles to visit the pick and drop-off locations. For another instance, a delivery company may have to make deliveries with a fleet of vehicles of limited load capacities. For yet another instance, a delivery company may have time constraints within which the deliveries must be made to the delivery locations. The optimal routing solution may need to be identified within a predetermined time window to ensure compliance with the time constraints. In some cases, the time window may be a few seconds or even milliseconds for determining a fastest route immediately after a user inputs navigation request into a map application. In some other cases, the time window may be a few minutes or even a few hours for planning optimal delivery routes for the next day's deliveries. Alternatively, in some embodiments, the environment may comprise an integrated circuit on which an optimal wiring solution is to be determined similarly as the routing solution.

FIG. 1 illustrates an environment associated with a routing problem or its variant instance in accordance with some embodiments. In some embodiments, an instance 110 comprises one or more warehouses 101, a plurality of locations 180 (such as houses waiting for deliveries from the one or more warehouses, or requesting pick-ups by the one or more warehouses), and one or more vehicles 102 that may visit the plurality locations through various routes. Each route may navigate along one or more roads, highways, air routes, waterways, other suitable channels connecting at least two locations, or any combination thereof. The goal of routing optimization may be to search for an optimal routing solution in order to minimize the traveling cost for the vehicles, while satisfying various constraints, such as time, travel distance, vehicle weight, size, range, power (e.g., gasoline, electricity) expense, another constraint, or any combination thereof. Both the traveling cost and constraints may be instance-specific.

In some embodiments, the environment may include a computing system 120 comprising one or more computing devices such as servers in a server cluster. The computing system 120 may obtain and represent the instance 110 as a computer-readable data structure 130. The data structure 130 may include a depot node 150 corresponding to the warehouse, a plurality of locations 160 corresponding to the plurality of locations 180, and a plurality of paths 170 among the locations 160. The plurality of paths 170 may be associated with features related to traveling cost (e.g., distances, tolls, traffics), road conditions, speed limits, number of traffic lights and stop signs, etc. A route under a routing solution (e.g., route 190) may start from a starting point such as the depot 150, include one or more of the plurality of paths 170 that are connected to one another, and cover one or more of the plurality of locations 160. Each path 170 may allow traffic in one-way or both directions. Each location 160 may be associated with a number of features including static features and dynamic features. Static features may be independent from the routing solution and include, for example, location information (e.g., map coordinates or address of a location 160), demand information (e.g., number of packages to be delivered or for pick-up, total size or weight of the packages, a soft or hard estimated-time-of-arrival for delivery or pick-up), another suitable information, or any combination thereof. Dynamic features may be routing solution-specific and include, for example, the position information associated with one or more neighboring locations along the route under a current routing solution, a remaining capacity of a vehicle leaving a location, another suitable information, or any combination thereof.

In some embodiments, the computing system 120 may determine one or more routing solutions (e.g., an optimal routing) based on the data structure 130 and/or other information. An example of a routing solution is described below with reference to FIG. 2. The computing system 120 may provide the one or more routing solutions to the one or more vehicles 102 (e.g., in-vehicle computer), one or more computing devices (e.g., computer 103 of a routing control center, mobile phone 104 of vehicle driver), or the like for effectuating the routing. In the environment, each of the systems and devices may be installed with appropriate software (e.g., application program interface) and/or hardware (e.g., wires, wireless connections) to access other devices of the environment. In general, the systems and devices may be able to communicate with one another through one or more wired or wireless networks (e.g., the Internet) through which data can be communicated. Each of the systems and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the systems and devices are shown as separate components in this figure, it will be appreciated that these devices can be implemented as single devices or multiple devices coupled together.

Figure 2:
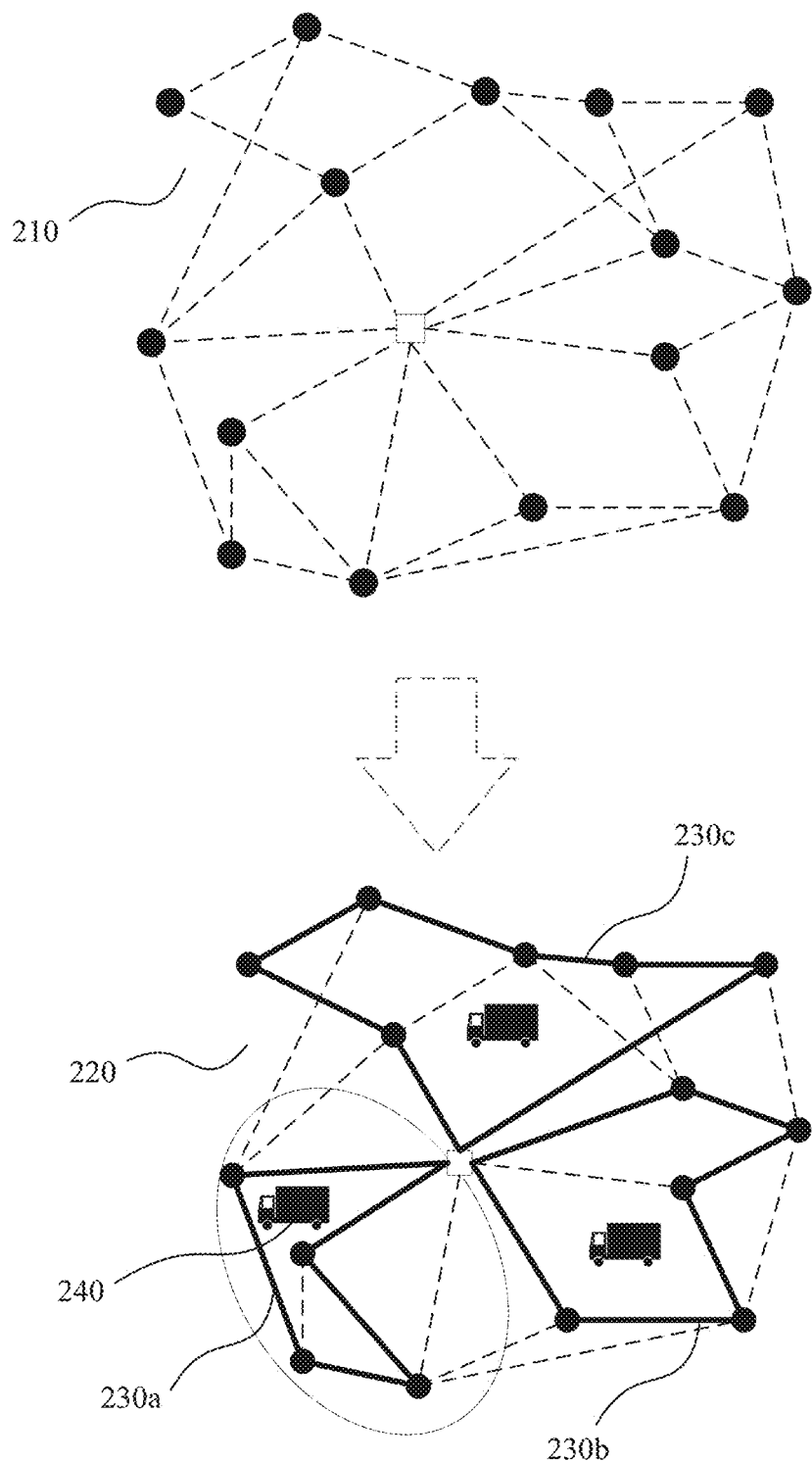
FIG. 2 illustrates an example of a routing solution for a routing problem or its variant instance in accordance with some embodiments.

FIG. 2 illustrates an example of a routing solution for a routing problem or its variant instance in accordance with some embodiments. In some embodiments, a routing solution 220 for an instance satisfies one or more instance-specific constraints. For example, a company may require some of the users to be serviced by the end of the day (e.g., the buyers have ordered same-day shipping), then the routing solution may be determined to include one or more routes such that the vehicles 240 are able to visit all these users by the end of the day. As shown, three vehicles 240 may cover all locations respectively via route 230a, route 230b, and route 230c. Determining the one or more routes may take into account the locations of the users, the traffic information, vehicle's capacities (size limit, weight limit, range limit), features of the packages to be serviced (such as frozen items, fragile items, size, weight), another suitable information, or any combination thereof. For another example, a service provider may require the expense for servicing all users to be lower than a predetermined budget. The expense may include power expense (such as gasoline expense, electricity expense, other type of energy expenses, or any combination thereof), labor expense (such as drivers' salaries, food, lodging, another type of expense, or any combination thereof), toll, another type of expense, or any combination thereof. A routing solution for such service provider may be determined to include one or more routes (230a, 230b, 230c) such that the total expense of the solution (sum of the expenses associated with each route) is lower than the budget. The expense associated with each route may have other constraints such as time, travel distance, vehicle weight, size, range, power (e.g., gasoline, electricity) expense, another constraint, or any combination thereof. In some embodiments, the vehicles 240 are uniform with respect to vehicle capacity, condition, fuel efficiency. In other embodiments, the vehicles 240 may be heterogeneous with respect to vehicle capacity, condition, fuel efficiency. In some embodiments, the instance 110 may have multiple constraints to satisfy. For instance, the instance 110 may have a first budget for the number of vehicles to be utilized, a second budget for the time to service, and a third budget for the total monetary expense. For example, the cost requirement is to use no more than 5 vehicles and deliver 100 packages by the end of the day, with the lowest traveling fuel and labor expenses.

Figure 3:
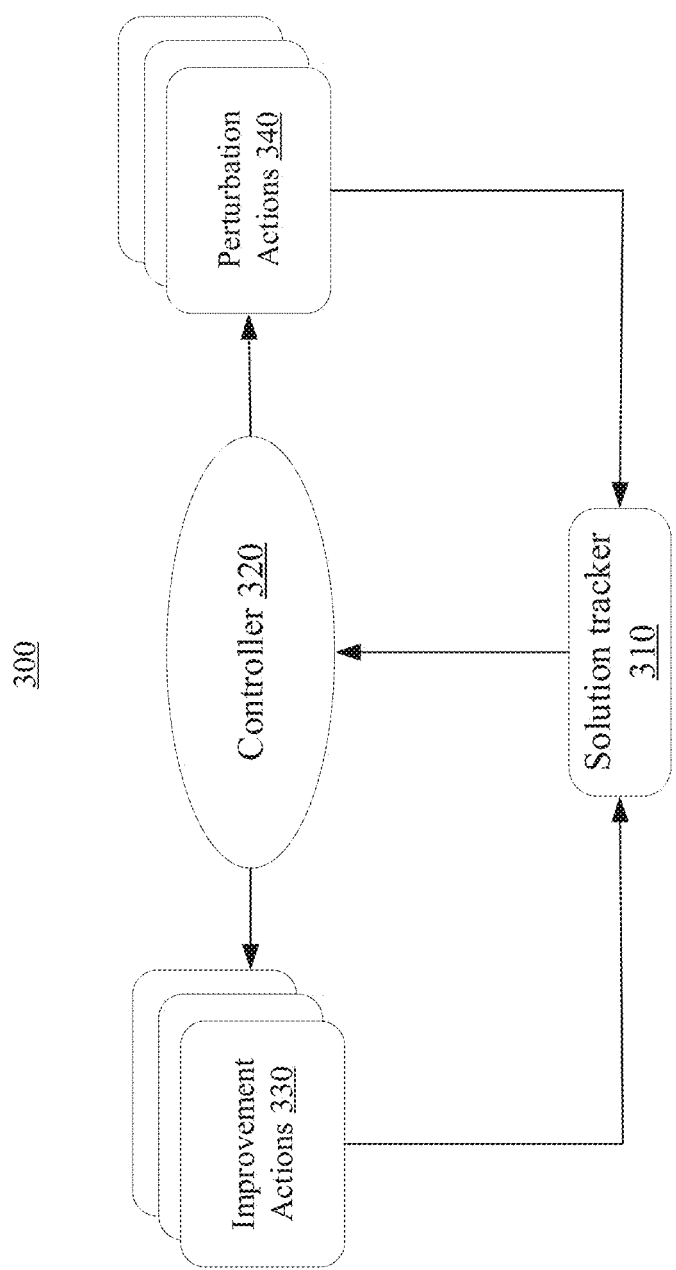
FIG. 3 illustrates an architecture associated with a method for determining routing in accordance with some embodiments.

FIG. 3 illustrates an architecture 300 associated with a method for determining routing in accordance with some embodiments. In some embodiments, the architecture 300 may include steps performed by a solution track 310 and a controller 320, both of which may be implemented as modules of a system for determining routing (e.g., the computing system 120). The system for determining routing may comprise one or more processors and one or more computer-readable memories coupled to the one or more processors and having instructions stored thereon that are executable by the one or more processors to perform the various steps. The modules may correspond to at least a portion of the instructions.

In one embodiment, the solution tracker 310 may be configured to track a current routing solution and its evolving history. The controller 320 may be configured to determine that, given the current routing solution, which action to apply to update the current routing solution. The controller 320 may apply one or more static or evolving policies as a guidance on the selection of actions. The possible actions that the controller 320 selects to apply may include two classes: improvement actions 330 and perturbation actions 340.

At each time step, one action may be selected by the controller 320 to apply to the current routing solution. The current routing solution may be improved when an improvement action 330 is applied to the solution. For example, if an improvement action 330 is applied to the current routing solution, the current routing solution may be adjusted in a way to reduce the overall cost of the routing solution while satisfying all the constraints for routing solution. The current routing solution may be re-constructed when a perturbation action 340 is applied to the solution. For example, if a perturbation action 340 is applied to the current routing solution, the current routing solution may be re-constructed into a new routing solution that may have a higher or lower overall cost while still satisfying all the constraints for routing solution. The updated routing solution after one improvement or perturbation action is applied becomes the current routing solution. As shown in FIG. 3, the application of the actions to the current routing solution may be iteratively performed, and the exploration for an optimal routing solution continues, until the controller 320 decides to terminate the process.

In some embodiments, the solution tracker 310 may be initialized with a hand-picked, human-engineered, randomly selected, or otherwise generated initial routing solution for an instance of a VRP (or its variant). This initial routing solution may contain one or more routes for respectively routing one or more vehicles through a plurality of locations, with each route satisfying the constraints imposed by the instance (such as time, vehicle weight, size, range, expense, another constraint, or any combination thereof). The initial routing solution may correspond to a cost (e.g., traveling cost) that may be unacceptable or impractical to execute. The initial routing solution is the starting point for the architecture 300 to search for an optimal routing solution (e.g., routes for routing the one or more vehicles through the locations with a minimized traveling cost).

In some embodiments, the controller 320 may include two components: a first component configured to learn a policy associated with the improvement actions 330, and a second component configured to learn a policy associated with the perturbation actions 340. According to the policy, the controller 320 may determine which action to apply for a given input (e.g., the current routing solution) and when to apply the action. In some embodiments, the policy may be a rule-based condition-action mapping, such as applying action x when condition X is met. Such policy may be represented as a map, a table, a dictionary, a hash table, or another suitable data structure. In some embodiments, the policy may be a heuristic that suggests a particular action to apply in response to the given input. In some embodiments, a policy may be a function that is deterministic (by suggesting the exact action to take) or stochastic (by suggesting the possibility of an action that may be taken). The policy may be static, such as a human-engineered policy, or dynamic, such as an evolving policy being optimized using algorithms like reinforcement learning (RL). The policy optimization using RL may be to maximize an expected total reward with respect to the parameters of the policy.

In some embodiments, the first component of the controller 320 may use RL to learn an optimal policy that suggests which improvement action 330 to apply to a given routing solution (e.g., the current routing solution). The RL model may use Q-learning, deep Q-learning, policy gradient (gradient descent or ascent depending on how the reward of the RL model is shaped), another policy optimization algorithm, or any combination thereof to optimize the policy. For example, the controller 320 may use an RL model with policy gradient to optimize a policy that suggests an action with a confidence score (e.g., possibility) to apply to the current routing solution. However, since the policy learned by RL with policy gradient is usually stochastic, the policy may allow the controller 320 to explore the possible optimizations without always taking the same action even for the same input. In some embodiments, it is possible that the improvement action 330 suggested by the policy does not actually reduce the cost of the current routing solution. In these cases, the controller 320 may skip the suggested improvement action 330 without applying any real action at this time step (i.e., the action includes a no-operation for this time step and the current routing solution stays the same). In other embodiments, the controller 320 may apply the improvement action 330 and receive a negative reward (meaning "applying this action to such routing solution is bad") leading to adjusting the policy by lowering the possibility of applying such action to a similar routing solution in the future.

In some embodiments, the first component of the controller 320 may adopt a Boosting method by training multiple reasonably good policies using multiple RLs for the same VRP (or its variant) instance. Subsequently, the system 330 may choose the best routing solution from the routing solutions identified by all the RLs as the final optimal routing solution. In some embodiments, the multiple RLs may share common configurations such as a plurality of possible improvement actions to apply, how many episodes to run in order to train corresponding policies, other suitable configurations, or any combination thereof. At the same time, the multiple RLs may have some differences in order to learn multiple policies with different emphases. In some embodiments, the multiple RLs may have different state representations, e.g., in addition to the information of the current routing solution, the state of some RLs may comprise information of one or more previous applied improvement actions that lead to the current routing solution. As an example, the first RL may use the current routing solution as its state, and thus the policy to be learned focuses on optimizing or perturbating the current solution. The second RL may include some historic data (such as X improvement actions that lead to the current routing solution, and corresponding effects) in addition to the current routing solution as its state. By considering a sequence of immediately preceding improvement actions in addition to the current routing solution, the policy to be learned may consider the impact of the historic action pattern that occurred prior to the current routing solution (that is, the evolving history of the current routing solution).

In some embodiments, the system may train multiple RL models. The state of an RL model i includes information of [action t−i, . . . action t−2, action t−1, current routing solution at time step t]. The "action t−i, . . . action t−2, action t-1" may refer to a sequence of applied improvement actions that have led to the current routing solution at time step t. For a VRP (or its variant) instance, multiple RL models may be executed to obtain the best routing solution from all the candidate solutions identified by the multiple RL models. In one embodiment, a system of seven RL models yields a better routing solution than a system of only one RL model by using the same total amount of computing cycles (e.g., CPU cycles, memory usage). For example, each of the seven RL models may be executed for 20,000 episodes, which correspond to a total of 140,000 episodes across all seven models, to provide a final optimal routing solution that is better than the solution identified by a system running one RL model for 140,000 episodes. In addition, since the seven RL models can run in parallel, they may identify a better version of the optimal routing solution theoretically seven times faster than the system only using one RL model.

In some embodiments, the second component of the controller 320 may use rule-based policy to make determinations such as when to apply a perturbation action 340, and if it is the time, which perturbation action 340 should be applied to the current routing solution. For example, if the controller 320 skips applying an improvement action 330 that is unable to reduce the cost of the routing solution, then the controller 320 may determine to apply a perturbation action 340, when the cost of the current routing solution was not reduced by a threshold level in the most recent ten time steps (that is, when the last ten improvement actions 330 selected by the policy are unable to optimize the current routing solution). For another example, the controller 320 may pick one of the perturbation actions 340 in a predetermined manner to perturbate the current routing solution, such as randomly, in a round-robin, or in another item-selection pattern. In some embodiments, the second component of the controller 320 may use one or more RL models to learn one or more policies to determine "when to apply a perturbation action 340," "which perturbation action 340 to apply in current situation," another suitable state-action question, or any combination thereof.

In some embodiments, applying the improvement actions 330 may include adjusting the current routing solution to reduce the cost. The improvement actions may include intra-route adjustments, inter-route adjustments, or any combination thereof. For example, an improvement action 330 may comprise one or more of the following: changing an order of at least two of the plurality of locations in one of the one or more routes, and moving a location from one of the one or more routes to another one of the one or more routes. In one embodiment, the adjustments associated with applying an improvement action 330 are small-scale (e.g., affecting a small number of routes within the routing solution) and not as drastic as applying a perturbation action 340 (e.g., reconstructing the entire routing solution). In one embodiment, one improvement action 330 may reduce the cost of one routing solution, but may not reduce the cost of a different routing solution. Before the controller 320 applies one improvement action 330, the controller 320 may need to determine whether the action will in fact reduce the cost of the routing solution. The determination may involve calculations of costs of one or more routing solutions. In some embodiments, the cost of a routing solution may be the total sum of the costs associated with the routes involved in the routing solution. The cost associated with each of the routes may be the total sum of the costs associated with visiting the locations. The cost associated with visiting each of the locations may be calculated based on one or more costs associated with the location (e.g., the number of packages to be delivered), one or more costs associated with the path leading to the location (e.g., expenses to travel, time to travel), or any combination thereof. Further details of the improvement actions 330 are described below with respect to FIG. 5.

In some embodiments, the perturbation actions 340 may include inter-route adjustments, or combinations of intra-route and inter-route adjustments to perturbate the current routing solution. For example, a perturbation action 340 may shuffle at least two of the plurality of locations among at least two of the routes for a current routing solution. For another example, a perturbation action 340 may concatenate at least two routes involved in the current routing solution. For yet another example, a perturbation action 340 may break at least one of the routes involved in the current routing solution into multiple routes. In some embodiments, a perturbation action 340 may be any combination of aforementioned actions. Further details of the perturbation actions 340 are described below with respect to FIG. 6.

Figure 4A:
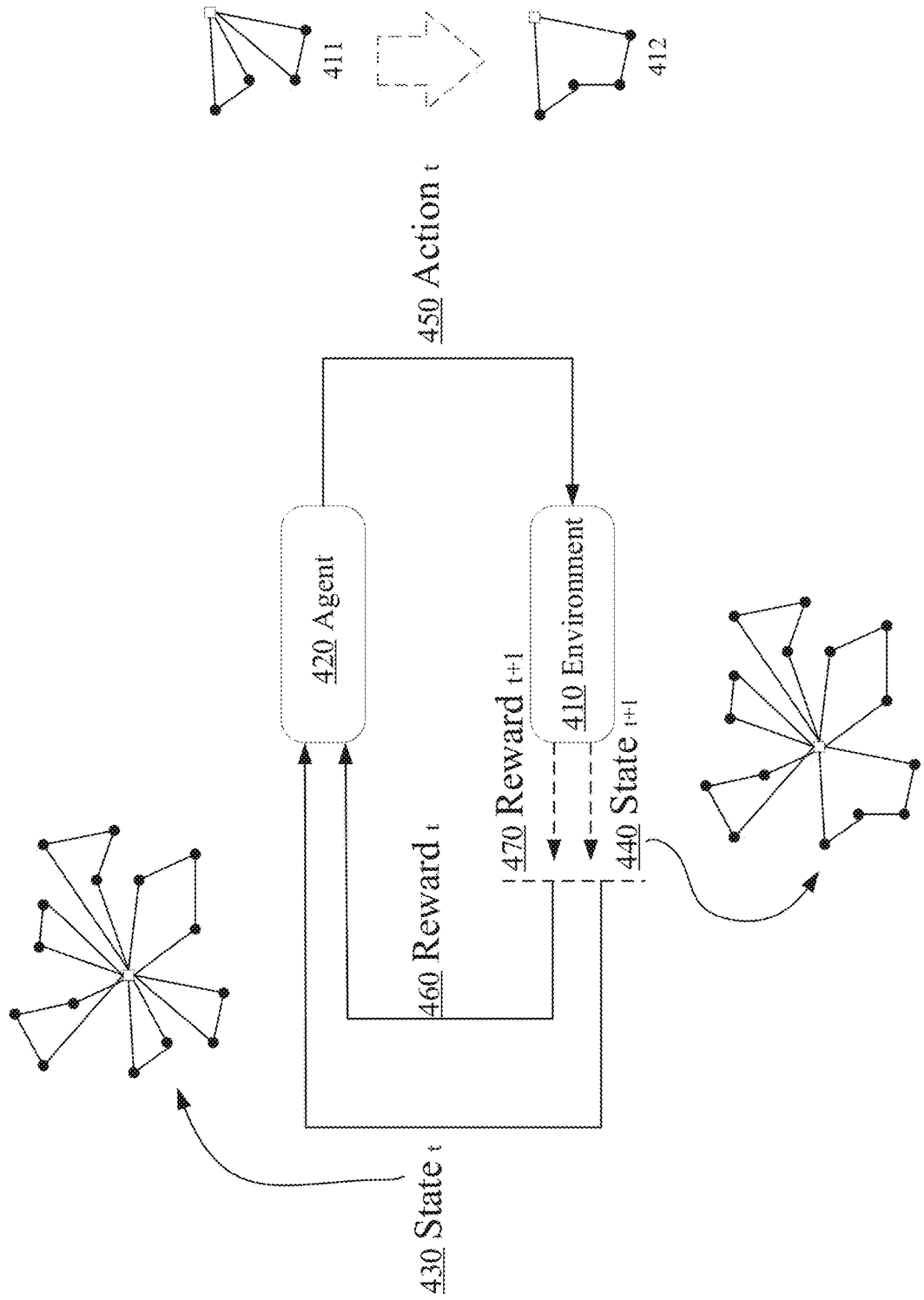
FIG. 4A illustrates a reinforcement learning (RL) based process for determining routing in accordance with some embodiments.

FIG. 4A illustrates a RL-based process for determining routing in accordance with some embodiments. RL is a machine learning technique that enables an agent to learn in an interactive environment by trial and error using feedback from its own actions and experiences. Unlike supervised learning, the goal of RL is to find a suitable action model that would maximize the total cumulative reward of the agent. As shown in FIG. 4A, in some embodiments, the RL model may be configured with a plurality of components: the environment 410, an agent 420, a state 430 (which transitions to state 440 at a next time step) of the agent, a plurality of actions 450 to apply to the state to effectuate the state transition, and a reward 460 (which transitions to reward 470 at the next time step) associated with an applied action. In some embodiments, the plurality of actions 450 may comprise one or more improvement actions. The environment 410 corresponds to the instance of a VRP or its variant in which the agent 420 operates. The state 430 of the agent comprises information of the current routing solution being examined in the environment 410. One of the actions 450 may be applied to the State t 430 of the agent at a time step t, which may update the state 430 to a new State t+1 440 of the agent at a time step t+1. The Reward t+1 470 is the feedback from the environment in response to the update of the state of the agent when the action 450 is applied. The RL may subsequently adjust its policy (i.e., the policy's parameters) based on the reward.

In some embodiments, the state 430 of the agent may include information of the current routing solution and information of one or more improvement actions previously applied to the state. In one example, the information of the current routing solution may include the routes included in the current routing solution, each route including features of one or more locations that the route covers. The features of one location may include instance-specific or static features that do not change under different routing solutions, such as the location information. The features may also include solution-specific features that are based on current routing solution. For example, given a routing solution with a set of routes, the features of one location may include the location's route-specific neighboring locations and their information (or distances from each neighboring location). For another example, the features of one location may also include the demand associated with the one location. In some embodiments, the demand may be represented as an instance-specific feature that does not change during the execution of a routing plan. In some other embodiments, the demand may change after the location is serviced. For example, the demand may become zero if the location has been visited by a dispatched vehicle and correspondingly serviced (e.g., making a complete delivery of ordered goods), or decrease in value if the location has been partially serviced. For another example, the information of one or more improvement actions previously applied to the state may comprise the one or more improvement actions that have taken, and the effects of the improvement actions (e.g., the rewards corresponding to the improvement actions).

In some embodiments, the action 450 may be an improvement action (e.g., single-route action or multiple-route action) or a perturbation action (e.g., re-construction action). Applying a single-route action may reduce the cost of the current routing solution by individually optimizing one or more routes. For example, applying a single-route solution may reorder locations to visit along a certain route by exchanging two locations in the route, or by moving a location to a new position within the route. Applying a multiple-route action may reduce the cost of the routing solution by moving or exchanging locations to be serviced among two or more routes. For example, instead of servicing a location in route A as a current routing solution suggests, applying a multiple-route action may move the location to route B. A multiple-route action may include crossing (e.g., exchanging last N locations of one route with last M locations of another route, where N does not necessarily equal to M), reverse-crossing (e.g., reversing one of two routes and then performing the crossing action), symmetric-exchanging (e.g., exchanging a number of consecutive locations between two routes), asymmetric-exchanging (e.g., exchanging a number of consecutive locations from a first route with a different number of consecutive locations from a second route), relocating (e.g., moving a number of consecutive locations from a route to another route), cyclic-exchanging (e.g., exchanging cyclically one location among three routes), etc. A re-construction action may be applied when the current routing solution has reached a local optimal (e.g., when the cost of the current routing solution does not significantly further decrease) to generate a new current routing solution as a new starting point. The re-construction action may include random-permuting, cyclic-exchanging. For example, a re-construction action may comprise one or more of the following: shuffling at least two of the plurality of locations among at least two of the routes, concatenating at least two of the routes, and breaking at least one of the routes into multiple routes. As shown in FIG. 4A, the routing solution in State t 430 is optimized by an improvement action 450 that merges two routes in 411 into one route in 412 to update the routing solution and obtain a new routing solution in State t+1 440.

In some embodiments, the reward 460 or 470 may be an intermediate reward that focuses on the immediate impact of one or more improvement actions applied. For example, the reward may be an actual cost reduction by applying a selected improvement action. Take the illustration in FIG. 4A as an example, the Reward t+1 470 may be calculated as the difference between the cost associated with State t 430 and the cost associated with State t+1 440 after applying the Action t 450. For another example, the reward for applying the one or more improvement actions is a predetermined positive number (e.g., +1) if the one or more improvement actions reduce the cost of the routing solution or a predetermined negative number (e.g., −1) if the one or more improvement actions do not reduce the cost of the routing solution. If the action selected according to the policy of the RL is unable to reduce the cost of the current routing solution, the action may be skipped (no-operation) and the corresponding reward may be considered as the predetermined negative number (e.g., −1) to indicate the failure to optimize the routing solution. Take the illustration in FIG. 4A as an example, the reward t+1 470 is calculated as +1 if the cost associated with State t+1 440 is smaller than the cost associated with State t 430 after applying the Action t 450, and as −1 if otherwise.

In some embodiments, the reward may be advantage-based. In one example, if applying the one or more of the plurality of improvement actions to the state before perturbing one of the updated routing solutions corresponds to a first iteration, the reward for applying the one or more improvement actions in an i-th iteration comprises a difference between a prior total cost reduction of a prior iteration and a total cost reduction of the i-th iteration. For example, an iteration may refer to a process of applying one or more improvement actions consecutively until a perturbation action needs to be applied to perturbate the routing solution. Under advantage-based reward, a reward of an action may not be immediately determined until the current iteration is over. The total cost reduction achieved during the first iteration (that is, the optimization process from the initial routing solution to right before the first perturbation action is applied) may be taken as a baseline. Subsequently, all improvement actions applied during the i-th iteration may receive the same reward that is the difference between the total cost reduction of the baseline iteration and the total cost reduction achieved during the i-th iteration. In some embodiments, the reward may use a future discount factor to give a higher weight to rewards received recently than rewards to be received in the future.

In some embodiments, the RL model illustrated in FIG. 4A may focus on learning a policy on applying improvement actions to optimize the routing solution. Therefore, the RL model may not consider the related rewards associated with applying perturbation actions to the routing solution. The routing solution after applying a perturbation action may become a new initial routing solution for the RL to further optimize in a new iteration. In some embodiments, one or more separate RL models may be used to learn one or more policies that determine when to apply a perturbation action, which perturbation action(s) to apply, and in what order the perturbation action(s) should be applied, etc.

Figure 4B:
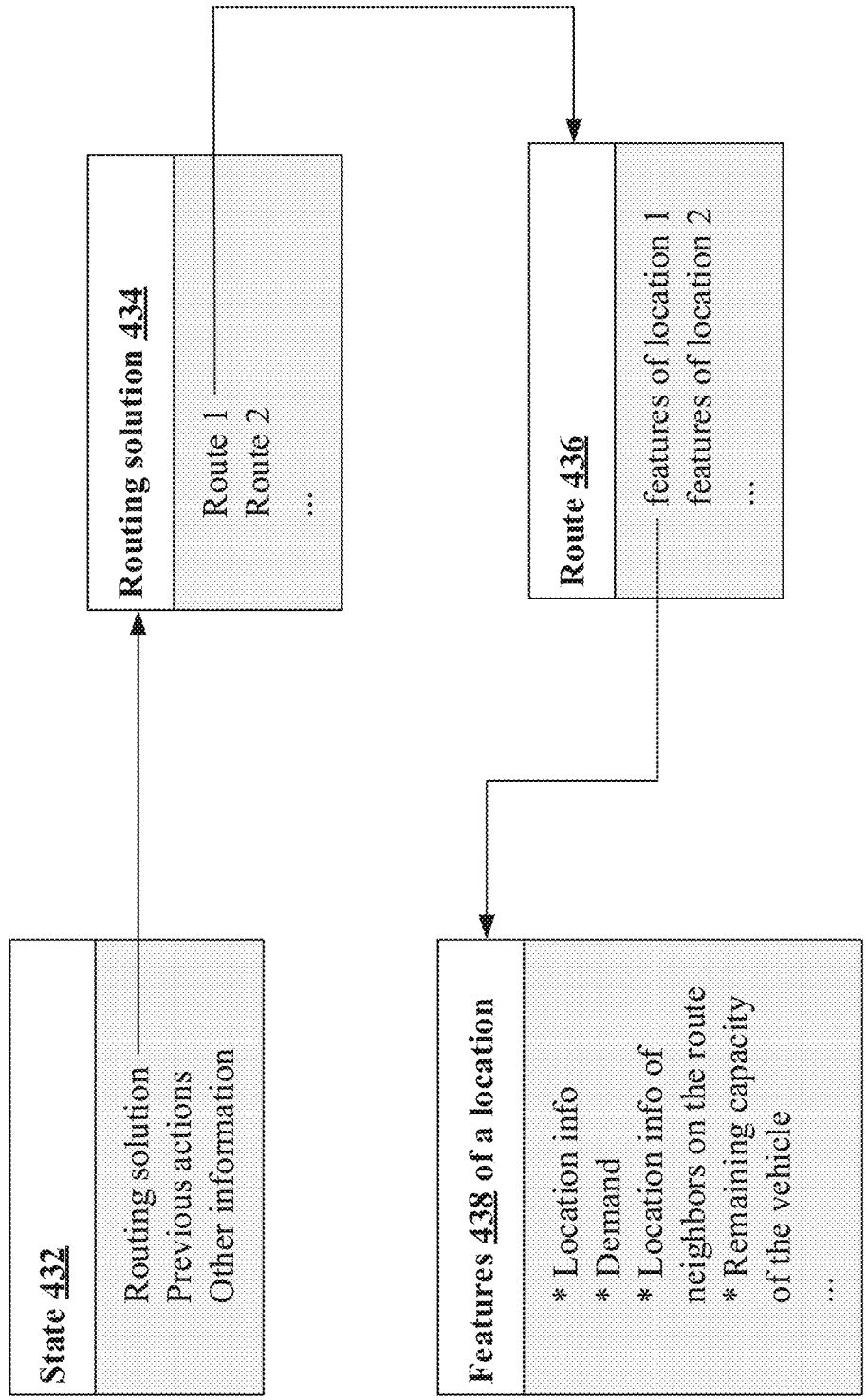
FIG. 4B illustrates a state representation scheme of an RL algorithm for determining routing in accordance with some embodiments.

FIG. 4B illustrates a state representation scheme of an RL algorithm for determining routing in accordance with some embodiments. As shown in FIG. 4B, a State 432 of the RL model may include information of a current routing solution 434, information of one or more improvement actions previously applied to the state that have led to the current routing solution 434, and other suitable information. The routing solution 434 may contain one or more routes for respectively routing one or more vehicles through a plurality of locations. Each route 436 may be associated with features corresponding to one or more locations along the route. The features 438 of each location may include location information (such as address, coordinates, or another suitable identifier) of the location, demand information of the location, location information of neighboring locations on the corresponding route, remaining capacity of the vehicle after servicing the location, other suitable information, or any combination thereof.

In some embodiments, the state may be represented as one or more vectors using embedding techniques such as attention embedding. For example, the features 438 of a location in the state may be transformed into an embedding vector by using three stacks of attention layers. Accordingly, the route 436 may be represented as a vector with a plurality of elements, with each element corresponding to a feature of a location. In other words, the route 436 may be represented as a two-dimensional vector. In some embodiments, the routing solution 434 may be represented as a vector with a plurality of elements, with each element corresponding to a vector of a route included in the routing solution. In other words, the routing solution 434 may be represented as a three-dimensional vector. In some other embodiments, the routing solution 434 may be represented as a linked-list or a vector by concatenating the plurality of routes therein. When concatenating the routes, for example, route 1 and route 2, the tail node of route 1 (a routing returning to the depot node) and the head node of route 2 (a routing starting from the depot node) may refer to the same depot node. Therefore the linked-list may merge the two depot nodes into one to represent both the tail of route 1 and the head of route 2. In some embodiments, the length of the linked-list representing the routing solution may be configured to a fixed length for simplification. If the total elements of a routing solution is smaller than the fixed length, the RL model may perform zero-paddings (adding 0s) to force the linked-list to be of the fixed length.

Figure 5:
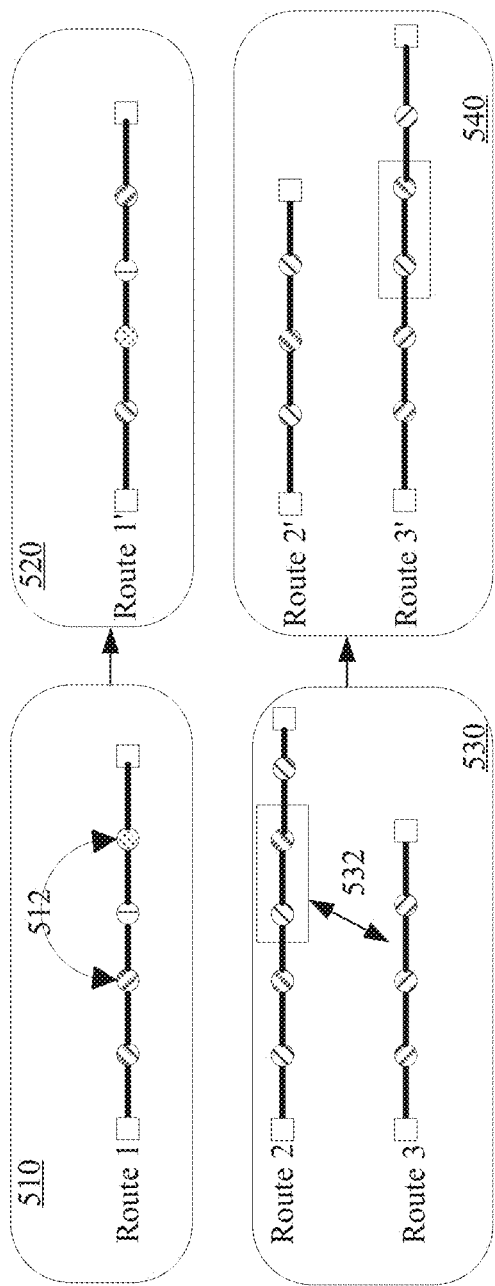
FIG. 5 illustrates two methods for optimizing a routing solution in accordance with some embodiments.

FIG. 5 illustrates two methods for optimizing a routing solution in accordance with some embodiments. FIG. 5 shows two examples (a single-route action and a multiple-route action) of the improvement action described above. In one example, the route 1 in box 510 is updated to route 1' in box 520 after an "exchange" action 512 is applied. Thus, two of the plurality of locations exchange their positions (order of service) in the route. In another example, the route 2 and route 3 in box 530 are updated to route 2' and route 3' in box 540 after an "move" action 532 is applied. Thus, two locations of route 2 are relocated into route 3. Although only one action is shown for each improvement action here, an improvement action may include one or more "exchange" actions, one or more "move" actions, other suitable actions, or any combination thereof.

Figure 6:
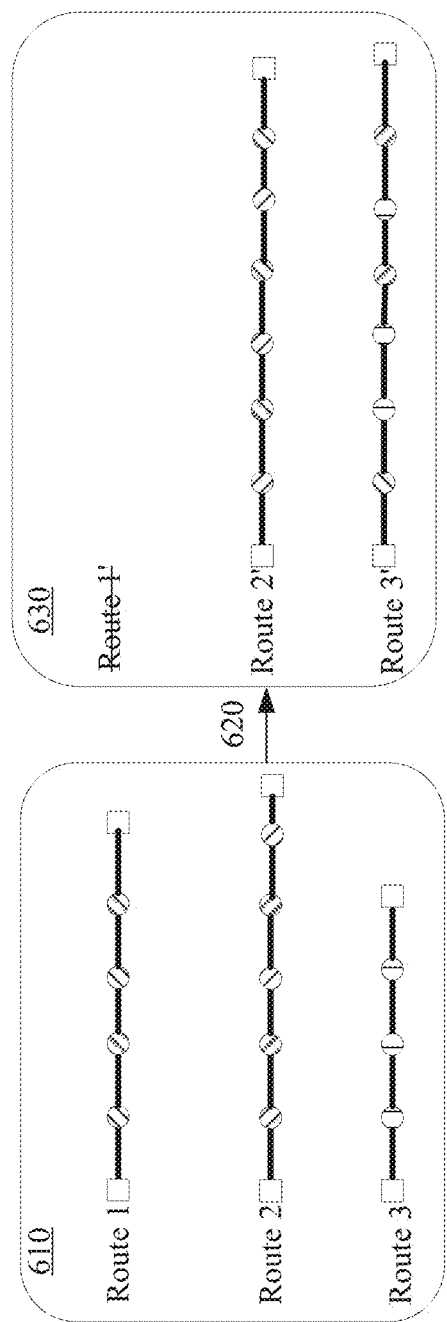
FIG. 6 illustrates a method for perturbating a routing solution in accordance with some embodiments.

FIG. 6 illustrates a method for perturbating a routing solution in accordance with some embodiments. As shown in FIG. 6, the routing solution 610 contains three routes: route 1, route 2, and route 3. After a perturbation action 620 is applied, the routing solution 610 is reconstructed into a new routing solution 630. For example, the locations on route 1 of routing solution 610 are moved into route 2 and route 3, and route 2 and route 3 exchange some of their locations. As a result of the perturbation action 620, the new routing solution only contains 2 routes: route 2' and route 3'. When a perturbation action is applied, the goal is to perturbate the routing solution, without concerning with the cost change of the routing solution associated with the action. In other words, when a regional (or local) optimal routing solution is reached, the perturbation action may be applied to move the exploration into another region to further search for the optimal routing solution within the new region.

Figure 7:
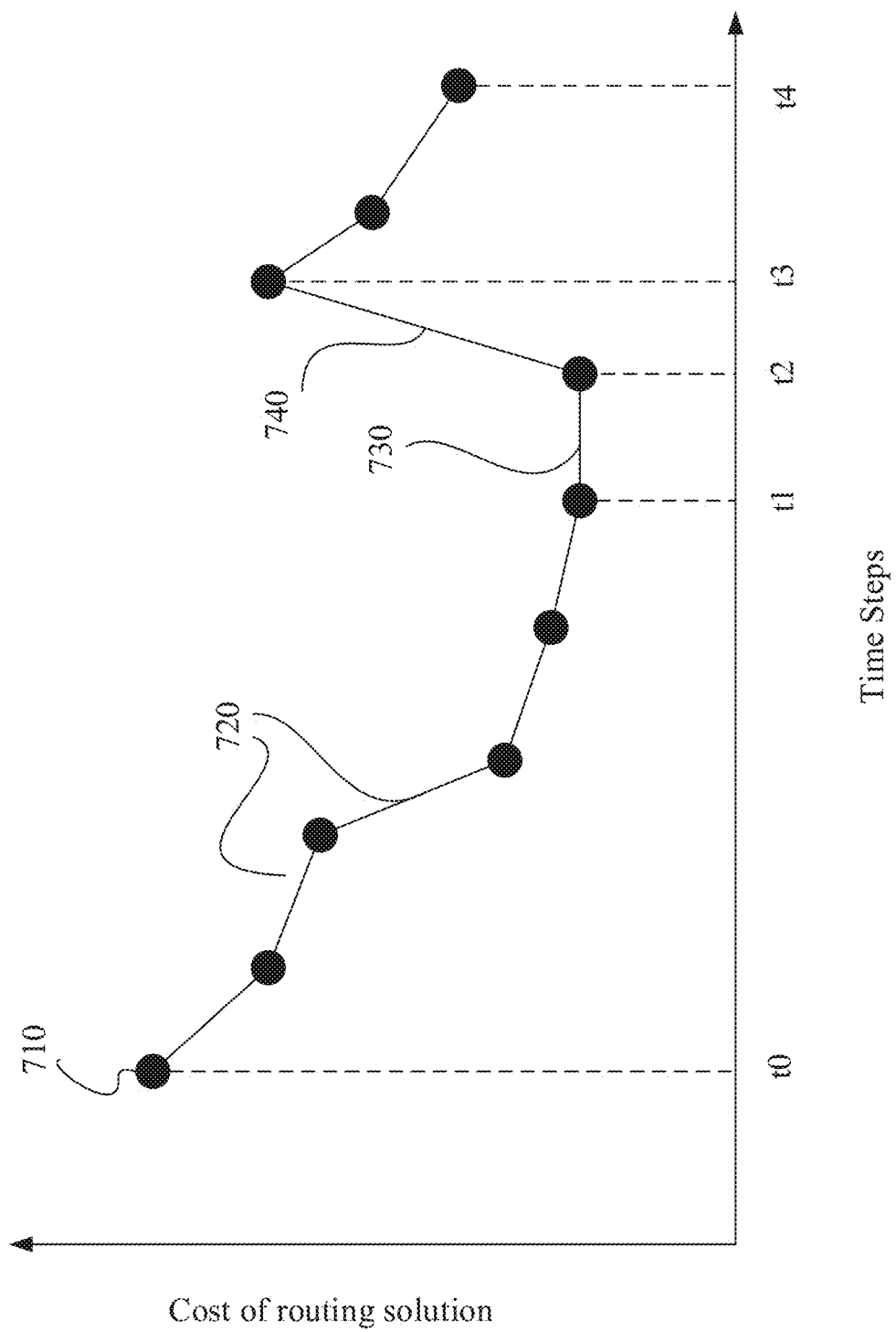
FIG. 7 illustrates a chart of routing solution transition trajectory in accordance with some embodiments.

FIG. 7 illustrates a chart of routing solution transition trajectory in accordance with some embodiments. As shown in FIG. 7, a routing solution 710 may go through a sequence of transitions corresponding to a sequence of improvement and/or perturbation actions in order to find the optimal routing solution for a VRP (or its variant) instance. In some embodiments, the routing solution 710 at t0 may be an initial routing solution offered to the method. The initial routing solution may be hand-picked, human-engineered, randomly selected, or generated using other proper means, for the instance. This initial routing solution may contain one or more routes for respectively routing one or more vehicles through a plurality of locations, with each route satisfying the constraints imposed by the instance, such as time, travel distance, vehicle weight, size, range, power (e.g., gasoline, electricity) expense, another constraint, or any combination thereof. The initial routing solution may correspond to a cost that may be unacceptable or impractical to execute. In some embodiments, the routing solution 710 at t0 may be a perturbed routing solution from a previous iteration. An iteration may refer to one round of applying one or more improvement actions followed by applying a perturbation action to an evolving routing solution.

In some embodiments, the routing solution 710 may be updated after an action (optimization or perturbation) is applied. As shown in FIG. 7, some improvement actions 720 are applied to the routing solution between t0 and t1. The cost reductions corresponding to the improvement actions 720 may not be uniform. Some improvement actions may result in higher cost reductions than others. The determination of a cost reduction may involve calculating a cost of the routing solution. In some embodiments, the cost of the routing solution may be the total sum of the costs associated with the routes involved in the routing solution. The cost associated with each of the routes may be the total sum of the costs associated with visiting the locations. The cost associated with visiting each of the locations may be calculated based on one or more costs associated with the location (e.g., the number of packages to be delivered), one or more costs associated with the path leading to the location (e.g., expenses to travel, time to travel), or any combination thereof.

In some embodiments, the selection of improvement actions to apply to the routing solution may be based on one or more predetermined rules, or one or more policies that is learned by machine learning algorithms. As an example, an optimization action may be randomly selected from a pool of improvement actions without knowing whether it will in fact reduce the cost of the routing solution. As another example, an optimization action may be selected according to a policy of a machine learning model. In some embodiments, the machine learning model may be a supervised learning model with one or more sets of training data collected by previous experiments or historic data. In some embodiments, the machine learning model may be an unsupervised learning model such as a reinforcement learning model that adjusts and improves the policy according to feedbacks (e.g., rewards) received from the instance after taking certain actions.

In some cases, an optimization action to be applied to the routing solution may not be able to actually reduce the cost of the routing solution. In some embodiments, an unsupervised machine learning model may still apply such action and receive a negative reward (meaning "applying this action to such routing solution is bad") leading to adjusting the policy by lowering the possibility of applying such action to a similar routing solution in the future. In some other embodiments, if the method determines the action to be applied may fail to reduce the cost, it may skip applying such action at the current time step. As shown in FIG. 7, if the method determines action 730 to be applied to the routing solution at t1 does not reduce its cost (meaning, the cost may increase or stay the same after applying action 730), it skips the action and as a result the cost of the routing solution does not change from t1 to t2. In some other embodiments, if an optimization action selected according to a rule or a policy does not reduce the cost of the routing solution, the method may sample some other improvement actions in a predetermined manner to attempt to optimize the routing solution. The sampling process may be subject to a time or computing resource budget. If the sampling process finds one optimization action that can reduce the cost of the routing solution, the method may apply the action. Otherwise, after the budget is reached or exceeded, the method may determine to apply one of the improvement actions it sampled, or skip applying any optimization action.

In some embodiments, the method may apply a perturbation action to the routing solution after a predetermined condition is satisfied. As an example, the predetermined condition may be that the cost of the routing solution fails to reduce after a threshold number of consecutive improvement actions are applied to the state. When such condition is met, it means the routing solution has locally reached to a relatively optimal routing solution within the current region of candidate solutions. As a result, the determination of the threshold number becomes a tradeoff consideration between (1) continuing exploring for a better solution within the current region of candidate solutions, and (2) switching to another region of candidate solutions to explore. In some embodiments, in order to switch to another region of candidate solutions, the method may apply one or more perturbation actions to perturbate the routing solution. As shown in FIG. 7, after a perturbation action 740 is applied to the routing solution at t2, the cost of the perturbed routing solution at t3 increases. In some embodiments, the perturbed routing solution at t3 may become a new starting point for a next iteration for exploration of an optimal routing solution (as shown in FIG. 7 between t3 and t4).

In some embodiments, the predetermined condition may be a policy learned by a machine learning model such as RL. The RL model may be designed to shape a policy that suggests when the routing solution should be perturbated for a given state. In some embodiments, the method may also use a machine learning model such as RL to learn a policy that suggests which perturbation action should be applied for a given state. In some embodiments, the method may use a machine learning model such as RL to learn a policy that suggests both when to apply a perturbation action, and which perturbation action to apply.

Figure 8:
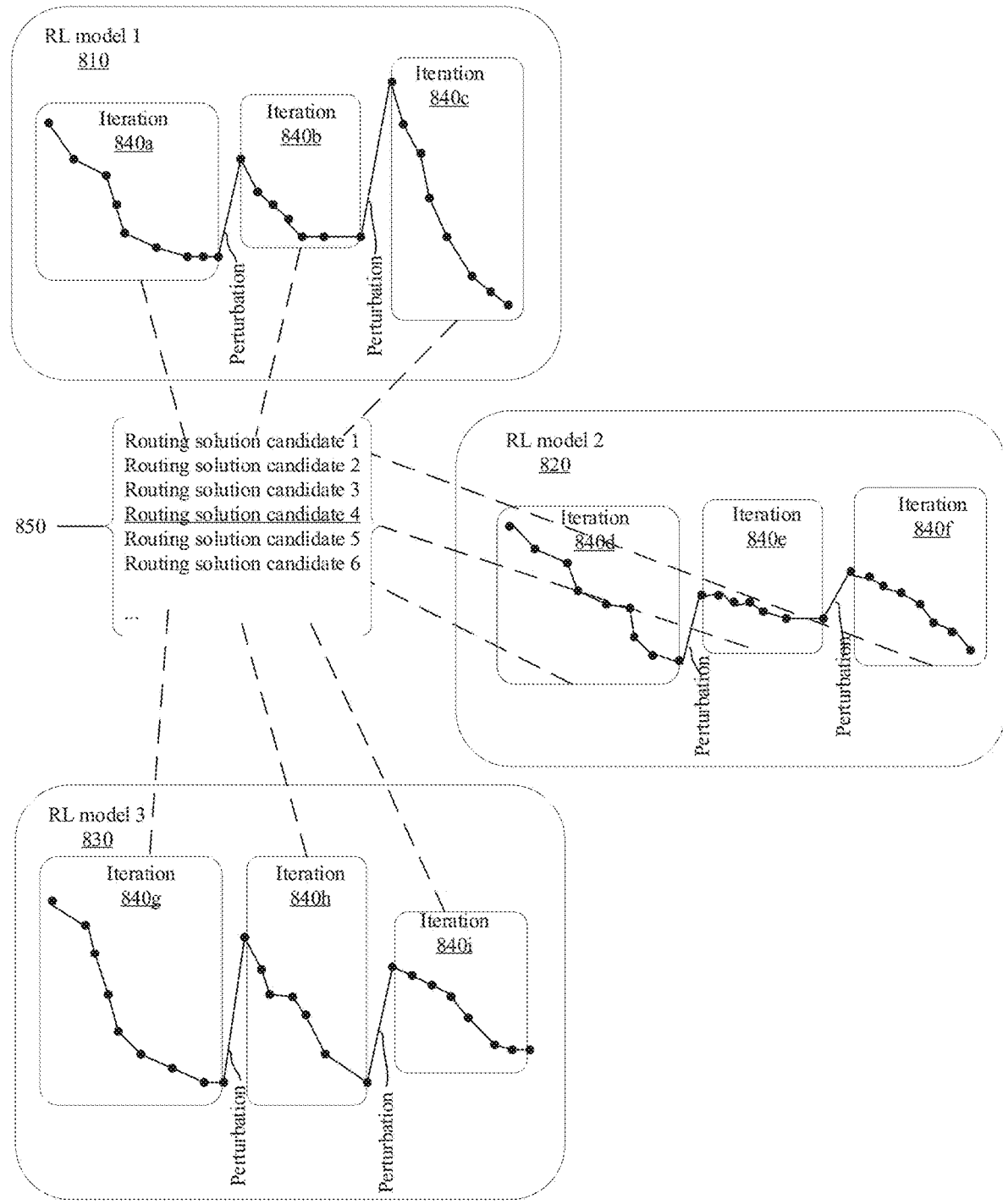
FIG. 8 illustrates a diagram of a method for determining routing using a plurality of RL models in accordance with some embodiments.

FIG. 8 illustrates a diagram of a method for determining routing using a plurality of RL models in accordance with some embodiments. In some embodiments, to search for an optimal routing solution for a given VRP (or its variant) instance, a plurality of RL models may be trained with different emphases. For example, the plurality of RL models may comprise N RL models each referred to as a j-th model, with j being 1, 2, 3, . . . , or N, and the state of the j-th RL model comprises information of (j−1) improvement actions previously applied to the state. In some embodiments, the method may start with, for each of a plurality of RL models, initializing the state of the each RL model based on the routing solution. The each RL model comprises a plurality of improvement actions for applying to the state according to a policy to reduce a cost of the routing solution. The method may further comprise, for each of the plurality of RL models, iteratively applying the one or more of the plurality of improvement actions to the state according to the policy to reduce the cost of the routing solution and to obtain updated routing solutions, until a predetermined condition is satisfied. The method may further comprise, for each of the plurality of RL models, perturbing one of the updated routing solutions and feeding the perturbed routing solution back to the each RL model for the each RL model to perform the applying one or more of the plurality of improvement actions according to the policy. The method may further comprise determining a routing solution (the optimal routing solution) with the minimum cost from the updated routing solutions obtained for the plurality of RL models. That is, the optimal routing solution with the minimum cost may be determined from the updated routing solutions obtained by all of the plurality of RL models.

As an example shown in FIG. 8, the method uses three different RL models: RL model 1 in box 810, RL model 2 in box 820, and RL model 3 in box 830. The RL models may share some common configurations such as the plurality of improvement actions, and the plurality of perturbation actions. The RL models may differentiate from each other by using different state representations. For example, in addition to the current routing solution that is included in their states, the three RL models in FIG. 8 may also each include a sequence of historic improvement actions applied prior to arriving at the current routing solution. For example, the different RL models may include different numbers of historic improvement actions and corresponding effects in their states. In doing so, the RL models take into account the effect of the sequence or pattern of applied improvement actions on the cumulative reward. The more historic improvement actions an RL model considers, the more the RL model is inclined to learn the pattern of the sequence of improvement actions applied, as well as the impact of the sequence of applied improvement actions on the current routing solution. In contrast, an RL model only considering the current routing solution may focus on the impact of the most recently applied action on the routing solution.

In some embodiments, for the given VRP (or its variant) instance, the method may run a predetermined number of iterations using each of the multiple RLs. An iteration may refer to a process of applying one or more improvement actions consecutively until a perturbation action needs to be applied to perturbate the routing solution (that is, until the cost of the routing solution cannot be reduced further within a predetermined budget). Between every two iterations, the method may apply one or more perturbation actions to the routing solution. As shown in FIG. 8, each RL model runs three iterations 840, with each iteration 840 (840a-804i) containing one or more consecutive improvement actions that reduce the cost of the routing solution. After every iteration 840, a perturbation action may be applied to reset the routing solution for the next iteration.

In some embodiments, for each of the three RL models, once the RL policy is unable to reduce the cost of the routing solution with a predetermined number of attempts or otherwise triggering a predetermined condition, the routing solution may be perturbed, and the perturbed routing solution may be fed back to the RL for further optimization. In some embodiments, this cyclic optimization-perturbation-optimization process continues until the method decides to exit or a predefined exit condition is triggered. For example, the exit condition may be reaching a predetermined number of iterations for the cyclic optimization-perturbation-optimization process.

In some embodiments, after the multiple RL models finish their iterations, the method may collect a plurality of routing solution candidates from each model, and pick the optimal routing solution from the candidates for the given VRP (or its variant) instance. As shown in FIG. 8, the method collects a plurality of routing solution candidates 850 from the iterations 840 (840a-804i) of the multiple RLs, and then pick the best one from the pool of candidates as the optimal routing solution for the instance.

In some embodiments, the final optimal routing solution may be determined from all the routing solutions obtained during all optimization phases by the three RL models. For example, each iteration shown in FIG. 8 comprises a plurality of dots respectively corresponding to costs of a plurality of routing solutions, many of which are intermediately updated routing solutions. The final optimal routing solution may be determined from the plurality of routing solutions, for example, based on the lowest cost.

In some embodiments, the method may create a number of VRP (or its variant) instances associated with the environment to train the multiple RL models, so that the trained models may properly react to a request for an optimal routing solution in that particular environment. For example, the method may create seven RL models with each RL model including a different number of historic improvement actions leading to the current routing solution in its corresponding state. Subsequently, assuming an environment has a number of locations, the method may create 5,000 instances by simulating 5,000 different demand distributions among the number of locations. For each of these 5,000 instances, the method may train the seven RL models by running each instance on each of the RL models for 2,000 iterations. Eventually, the seven RL models may be used to search for an optimal routing solution in response to a VRP or its variant associated with the environment.

Figure 9:
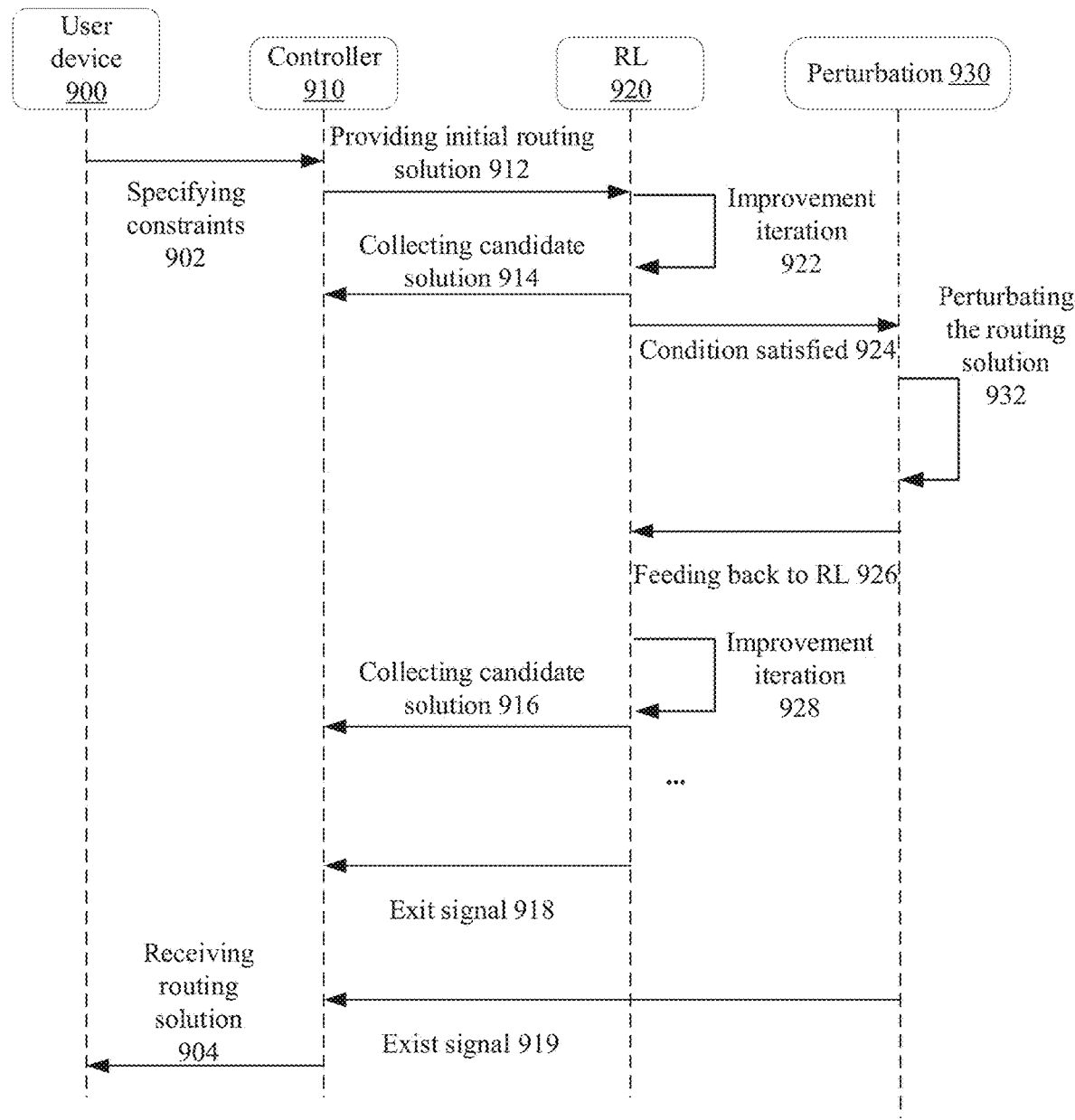
FIG. 9 illustrates a method for determining routing in accordance with some embodiments.

FIG. 9 illustrates a method for determining routing in accordance with some embodiments. In some embodiments, the method may start from a user device 900 specifying constraints of a VRP (or its variant) instance at step 902, such as time, travel distance, vehicle weight, size, range, power (e.g., gasoline, electricity) expense, another constraint, or any combination thereof. A final routing solution shall satisfy all the specified constraints. Accordingly, a controller 910 may provide an initial routing solution 912 that satisfies all the constraints but may have an optimized cost. The initial routing solution is the starting point for obtaining an optimal routing solution. After receiving the initial routing solution, a RL model 920 may perform an improvement iteration 922 to the initial routing solution. The improvement iteration may include applying one or more improvement actions to the routing solution according to a policy of the RL model. The RL model may adjust and improve its policy based on rewards received by applying one or more improvement actions. The reward may be an intermediate reward that focuses on the immediate impact of one or more improvement actions applied. The improvement iteration 922 may continue until a predetermined condition is satisfied. In some embodiments, the predetermined condition is that applying a threshold number of consecutive applied improvement actions fails to reduce the cost of the routing solution. For example, the condition is satisfied if the last ten consecutive improvement actions selected according to the RL's policy fail to reduce the cost of the routing solution. When such condition is satisfied, the controller 910 may collect one or more candidate routing solutions at step 914 from the improvement iteration 922. For example, the controller 910 may select the routing solution to which the last action or an intermediate action of the improvement interaction just applied as a candidate routing solution if it has the lowest cost.

Once the predetermined condition is satisfied at step 924, a regional (or local) optimal routing solution is reached. Then, the RL 920 may apply one or more perturbation operations to perturbating the routing solution at step 932. The purpose of the perturbation is to move the optimal routing solution exploration into another region. After the routing solution is perturbed, the cost may increase. The perturbed routing solution may subsequently be fed back to the RL 920 at step 926 as a new starting point for a new improvement iteration for the optimal routing solution. After receiving the perturbed routing solution, the RL 920 may perform another improvement iteration at step 928. Similarly, the controller may further collect one or more candidate solutions at step 916 after the RL's improvement iteration 928 is terminated (e.g., when the predetermined condition is satisfied.)

In some embodiments, the method may iteratively perform the following until an exit condition is met: applying one or more of the plurality of improvement actions to the state; and in response to the predetermined condition being satisfied, applying the perturbation action to obtain the perturbed routing solution and feeding the perturbed routing solution back to the RL model. For example, as shown in FIG. 9, the improvement iteration-perturbation-candidate solution collection cycle may be an iterative process that continues until an exit signal 918 or 919 is received by the controller. The exit signal may be received when an exit condition is met. In some embodiments, the exit signal 918 or 919 may be a predetermined number of improvement iterations that the method is set to run. In some embodiments, the exit signal 918 or 919 may be an intentional interruption from the user or the controller, such as when the RL 920 or the perturbation 930 fails to update the routing solution to a new routing solution by applying improvement actions or perturbation actions, respectively, within a predetermined period of time. At step 904, the user device 900 may receive an optimal routing solution with the lowest cost from the collected candidate solutions.

FIG. 10 illustrates a flowchart of a method 1000 for determining routing in accordance with some embodiments. The method 1000 may be performed by a device, apparatus, or system for determining routing. The method 1000 may be performed by one or more components of the environment or system illustrated by FIGS. 1-9, such as the computing system 120. Depending on the implementation, the method 1000 may include additional, fewer, or alternative steps performed in various orders or in parallel.

Block 1010 includes initializing a state of an RL model based on a routing solution comprising one or more routes for routing one or more vehicles through a plurality of locations, wherein the RL model comprises a plurality of improvement actions for applying to the state according to a policy to reduce a cost of the routing solution. In some embodiments, each of the updated routing solutions is subject to one or more constraints, the constraints comprising one or more of the following: time constraint; travel distance constraint; vehicle capacity constraint; and power expense constraint. In some embodiments, each of the plurality of locations is associated with one or more features, the features comprising one or more of the following: position information; demand information; position information of one or more neighboring locations along a corresponding route of the one or more routes; and a remaining capacity of a vehicle leaving the each of the plurality of locations. In some embodiments, the state of the RL model comprises the one or more features associated with the plurality of locations. In some embodiments, the state comprises information of one or more improvement actions previously applied to the state, such as the one or more improvement actions that have taken, and the effects of the improvement actions (e.g., the reward corresponding to the improvement actions).

In some embodiments, initializing the state of the RL model comprises: for each of a plurality of RL models comprising the RL model, initializing the state of the each RL model based on the routing solution, wherein the each RL model comprises a plurality of improvement actions for applying to the state according to a policy to reduce a cost of the routing solution. In some embodiments, applying the one or more of the plurality of improvement actions to the state comprises: for each of the plurality of RL models, applying the one or more of the plurality of improvement actions to the state according to the policy to reduce the cost of the routing solution and to obtain the updated routing solutions until the predetermined condition is satisfied, wherein the state comprises information of a number of improvement actions previously applied to the state, and wherein the number of improvement actions is different for each of the plurality of RL models. In some embodiments, applying the perturbation action to obtain a perturbed routing solution and feeding the perturbed routing solution back to the RL model comprises: for each of the plurality of RL models, applying the perturbation action to obtain a perturbed routing solution and feeding the perturbed routing solution back to the each RL model for the each RL model to perform the applying one or more of the plurality of improvement actions according to the policy. In some embodiments, determining the routing solution with the minimum cost from the updated routing solutions comprises: determining the routing solution with the minimum cost from the updated routing solutions obtained for the plurality of RL models.

In some embodiments, the plurality of RL models may comprise N RL models each referred to as a j-th model, with j being 1, 2, 3, . . . , or N; and the state of the j-th RL model comprises information of (j−1) improvement actions previously applied to the state.

Block 1020 includes applying one or more of the plurality of improvement actions to the state according to the policy to reduce the cost of the routing solution and to obtain updated routing solutions until a predetermined condition is satisfied. In some embodiments, the plurality of improvement actions for applying to the state according to the policy to reduce the cost of the routing solution comprise one or more of the following: changing an order of at least two of the plurality of locations in one of the one or more routes; and moving a location from one of the one or more routes to another one of the one or more routes. In some embodiments, the action comprises an operation or a no-operation. In some embodiments, the predetermined condition comprises that the cost of the routing solution fails to reduce after a threshold number of consecutive actions are applied to the state.

Block 1030 includes, in response to the predetermined condition being satisfied, applying the perturbation action to obtain the perturbed routing solution and feeding the perturbed routing solution back to the RL model for the RL model to perform the applying one or more of the plurality of improvement actions according to the policy. In some embodiments, applying the perturbation action comprises one or more of the following: shuffling at least two of the plurality of locations among at least two of the routes; concatenating at least two of the routes; and breaking at least one of the routes into multiple routes.

Block 1040 includes determining a routing solution with a minimum cost from the updated routing solutions.

In some embodiments, the method 1000 further comprises adjusting the policy based on a reward received by applying one or more of the plurality of improvement actions, wherein the reward is calculated based on cost changes after applying the one or more actions. In some embodiments, the reward for applying the one or more improvement actions is a predetermined positive number if the one or more improvement actions reduce the cost of the routing solution or a predetermined negative number if the one or more improvement actions do not reduce the cost of the routing solution. In some embodiments, applying the one or more of the plurality of improvement actions to the state before applying the perturbation action corresponds to a first iteration; and the reward for applying the one or more improvement actions in an i-th iteration comprises a difference between a prior total cost reduction of a prior iteration and a total cost reduction of the i-th iteration.

In some embodiments, the method 1000 further comprises iteratively performing the following until an exit condition is met: applying one or more of the plurality of improvement actions to the state; and in response to the predetermined condition being satisfied, applying the perturbation action to obtain the perturbed routing solution and feeding the perturbed routing solution back to the RL model until an exit condition is met. For example, the exit condition may be a predetermined number of cycles that the method is set to run. For another example, the exit condition may be an intentional interruption from the user.

Figure 11:
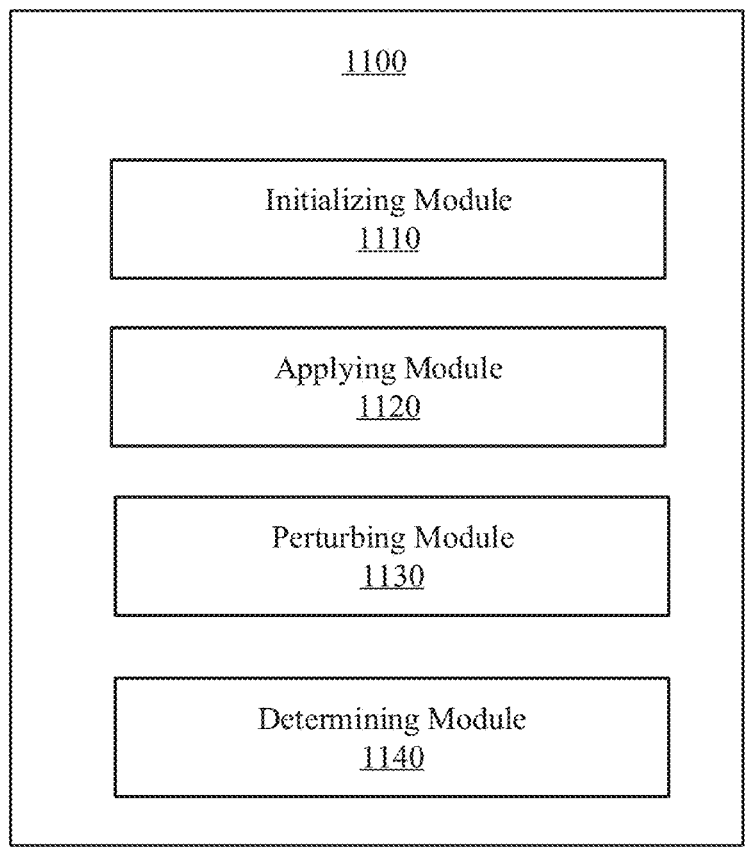
FIG. 11 illustrates a block diagram of a computer system for determining routing in accordance with some embodiments.

FIG. 11 illustrates a block diagram of a computer system 1100 for determining routing in accordance with some embodiments. The computer system 1100 may be an example of an implementation of one or more components of the computing system 120. The method 1000 may be implemented by the computer system 1100. The computer system 1100 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 1000. The computer system 1100 may comprise various units/modules corresponding to the instructions (e.g., software instructions).

In some embodiments, the computer system 1100 may be referred to as an apparatus for determining routing using reinforcement learning (RL). The apparatus may comprise an initializing module 1110 for initializing a state of an RL model based on a routing solution comprising one or more routes for routing one or more vehicles through a plurality of locations, wherein the RL model comprises a plurality of improvement actions for applying to the state according to a policy to reduce a cost of the routing solution; an applying module 1120 for applying one or more of the plurality of improvement actions to the state according to the policy to reduce the cost of the routing solution and to obtain updated routing solutions until a predetermined condition is satisfied; a perturbing module 1130 for, in response to the predetermined condition being satisfied, applying the perturbation action to obtain the perturbed routing solution and feeding the perturbed routing solution back to the RL model for the RL model to perform the applying one or more of the plurality of improvement actions according to the policy; and a determining module 1140 for determining a routing solution with a minimum cost from the updated routing solutions.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 12:
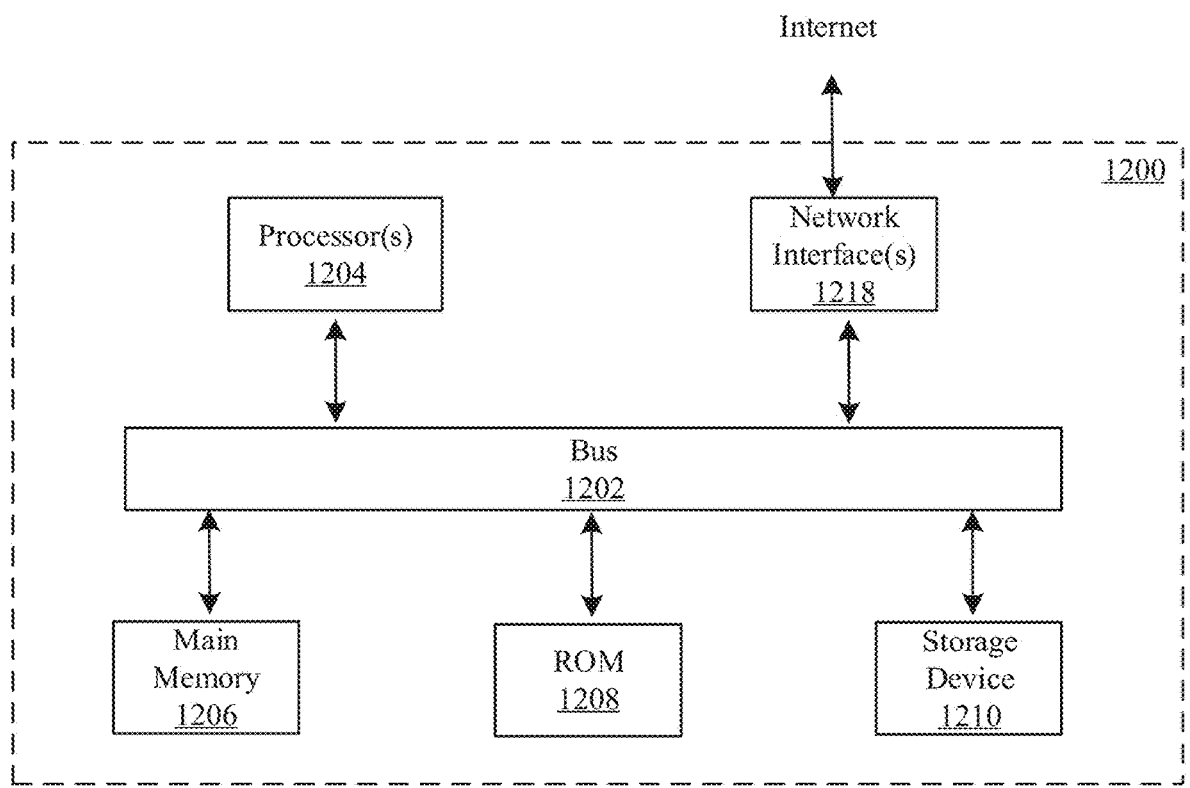
FIG. 12 illustrates a block diagram of a computer system in which any of the embodiments described herein may be implemented.

FIG. 12 illustrates a block diagram of a computer system 1200 in which any of the embodiments described herein may be implemented. The computer system 1200 may be implemented in any of the components of the environments or systems illustrated in FIGS. 1-11. One or more of the example methods illustrated by FIGS. 1-11 may be performed by one or more implementations of the computer system 1200.

The computer system 1200 may include a bus 1202 or other communication mechanism for communicating information, one or more hardware processor(s) 1204 coupled with bus 1202 for processing information. Hardware processor(s) 1204 may be, for example, one or more general purpose microprocessors.

The computer system 1200 may also include a main memory 1206, such as a random-access memory (RAM), cache and/or other dynamic storage devices, coupled to bus 1202 for storing information and instructions executable by processor(s) 1204. Main memory 1206 also may be used for storing temporary variables or other intermediate information during execution of instructions executable by processor(s) 1204. Such instructions, when stored in storage media accessible to processor(s) 1204, render computer system 1200 into a special-purpose machine that is customized to perform the operations specified in the instructions. The computer system 1200 may further include a read only memory (ROM) 1208 or other static storage device coupled to bus 1202 for storing static information and instructions for processor(s) 1204. A storage device 1210, such as a magnetic disk, optical disk, or USB thumb drive (Flash drive), etc., may be provided and coupled to bus 1202 for storing information and instructions.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the operations, methods, and processes described herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 may cause processor(s) 1204 to perform the process steps described herein. In alternative embodiments, hard-wired circuitry may be used in place of or in combination with software instructions.

The main memory 1206, the ROM 1208, and/or the storage device 1210 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 1200 may include a network interface 1218 coupled to bus 1202. Network interface 1218 may provide a two-way data communication coupling to one or more network links that are connected to one or more local networks. For example, network interface 1218 may be an integrated services digital network (ISDN) card, cable modem, satellite modem, or a modem to provide a data communication connection to a corresponding type of telephone line. As another example, network interface 1218 may be a local area network (LAN) card to provide a data communication connection to a compatible LAN (or WAN component to communicate with a WAN). Wireless links may also be implemented. In any such implementation, network interface 1218 may send and receive electrical, electromagnetic or optical signals that carry digital data streams representing various types of information.

The computer system 1200 can send messages and receive data, including program code, through the network(s), network link and network interface 1218. In the Internet example, a server might transmit a requested code for an application program through the Internet, the ISP, the local network and the network interface 1218.

The received code may be executed by processor(s) 1204 as it is received, and/or stored in storage device 1210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method for determining routing using reinforcement learning (RL), comprising:
   initializing a state of an RL model based on a routing solution comprising one or more routes for routing one or more vehicles through a plurality of locations, wherein the RL model comprises a plurality of improvement actions for applying to the state according to a policy to reduce a cost of the routing solution;
   applying one or more of the plurality of improvement actions to the state according to the policy to reduce the cost of the routing solution and to obtain updated routing solutions until a predetermined condition is satisfied;
   in response to the predetermined condition being satisfied, applying a perturbation action to obtain a perturbed routing solution and feeding the perturbed routing solution back to the RL model for the RL model to perform the applying one or more of the plurality of improvement actions according to the policy; and
   determining a routing solution with a minimum cost from the updated routing solutions.

2. The method of claim 1, wherein the plurality of improvement actions for applying to the state according to the policy to reduce the cost of the routing solution comprise one or more of the following:
   changing an order of at least two of the plurality of locations in one of the one or more routes; and
   moving a location from one of the one or more routes to another one of the one or more routes.

3. The method of claim 1, wherein applying the perturbation action comprises one or more of the following:
   shuffling at least two of the plurality of locations among at least two of the routes;
   concatenating at least two of the routes; and
   breaking at least one of the routes into multiple routes.

4. The method of claim 1, wherein each of the updated routing solutions is subject to one or more constraints, the constraints comprising one or more of the following:
   time constraint;
   travel distance constraint;
   vehicle capacity constraint; and
   power expense constraint.

5. The method of claim 1, wherein each of the plurality of locations is associated with one or more features comprising one or more of the following:
   position information;
   demand information;
   position information of one or more neighboring locations along a corresponding route of the one or more routes; and
   a remaining capacity of a vehicle leaving the each of the plurality of locations.

6. The method of claim 5, wherein the state comprises the one or more features associated with the plurality of locations.

7. The method of claim 1, wherein the state comprises information of one or more improvement actions previously applied to the state.

8. The method of claim 1, further comprising:
   adjusting the policy based on a reward received by applying one or more of the plurality of improvement actions, wherein the reward is calculated based on cost changes after applying the one or more improvement actions.

9. The method of claim 8, wherein the reward for applying the one or more improvement actions is a predetermined positive number if the one or more improvement actions reduce the cost of the routing solution or a predetermined negative number if the one or more improvement actions do not reduce the cost of the routing solution.

10. The method of claim 8, wherein:
applying the one or more of the plurality of improvement actions to the state before applying the perturbation action corresponds to a first iteration; and
the reward for applying the one or more improvement actions in an i-th iteration comprises a difference between a prior total cost reduction of a prior iteration and a total cost reduction of the i-th iteration.

11. The method of claim 1, wherein the improvement action comprises an operation or a no-operation.

12. The method of claim 1, wherein the predetermined condition comprises that the cost of the routing solution fails to reduce after a threshold number of consecutive improvement actions are applied to the state.

13. The method of claim 1, wherein:
initializing the state of the RL model comprises: for each of a plurality of RL models comprising the RL model, initializing a state of the each RL model based on a routing solution, wherein the each RL model comprises a plurality of improvement actions for applying to the state according to a policy to reduce a cost of the routing solution;
applying one or more of the plurality of improvement actions to the state comprises: for each of the plurality of RL models, applying one or more of the plurality of improvement actions to the state according to the policy to reduce the cost of the routing solution and to obtain updated routing solutions until a predetermined condition is satisfied, wherein the state comprises information of a number of improvement actions previously applied to the state, and wherein the number of improvement actions is different for each of the plurality of RL models;
applying the perturbation action to obtain the perturbed routing solution and feeding the perturbed routing solution back to the RL model comprises: for each of the plurality of RL models, applying a perturbation action to obtain a perturbed routing solution and feeding the perturbed routing solution back to the each RL model for the each RL model to perform the applying one or more of the plurality of improvement actions according to the policy; and
determining the routing solution with the minimum cost from the updated routing solutions comprises: determining the routing solution with the minimum cost from the updated routing solutions obtained for the plurality of RL models.

14. The method of claim 13, wherein:
the plurality of RL models comprise N RL models each referred to as a j-th model, with j being 1, 2, 3, . . . , or N; and
the state of the j-th RL model comprises information of (j−1) improvement actions previously applied to the state.

15. The method of claim 1, wherein the method comprising iteratively performing the applying one or more of the plurality of improvement actions to the state, and in response to the predetermined condition being satisfied, the applying the perturbation action to obtain the perturbed routing solution and feeding the perturbed routing solution back to the RL model until an exit condition is met.

16. A system for determining routing using reinforcement learning (RL) comprising one or more processors and one or more non-transitory computer-readable memories coupled to the one or more processors and configured with instructions executable by the one or more processors to cause the system to perform operations comprising:
initializing a state of an RL model based on a routing solution comprising one or more routes for routing one or more vehicles through a plurality of locations, wherein the RL model comprises a plurality of improvement actions for applying to the state according to a policy to reduce a cost of the routing solution;
applying one or more of the plurality of improvement actions to the state according to the policy to reduce the cost of the routing solution and to obtain updated routing solutions until a predetermined condition is satisfied;
in response to the predetermined condition being satisfied, applying a perturbation action to obtain a perturbed routing solution and feeding the perturbed routing solution back to the RL model for the RL model to perform the applying one or more of the plurality of improvement actions according to the policy; and
determining a routing solution with a minimum cost from the updated routing solutions.

17. The system of claim 16, wherein the plurality of improvement actions for applying to the state according to the policy to reduce the cost of the routing solution comprise one or more of the following:
changing an order of at least two of the plurality of locations in one of the one or more routes; and
moving a location from one of the one or more routes to another one of the one or more routes.

18. The system of claim 16, wherein applying the perturbation action comprises one or more of the following:
shuffling at least two of the plurality of locations among at least two of the routes;
concatenating at least two of the routes; and
breaking at least one of the routes into multiple routes.

19. A non-transitory computer-readable storage medium for determining routing using reinforcement learning (RL) configured with instructions executable by one or more processors to cause the one or more processors to perform operations comprising:
initializing a state of an RL model based on a routing solution comprising one or more routes for routing one or more vehicles through a plurality of locations, wherein the RL model comprises a plurality of improvement actions for applying to the state according to a policy to reduce a cost of the routing solution;
applying one or more of the plurality of improvement actions to the state according to the policy to reduce the cost of the routing solution and to obtain updated routing solutions until a predetermined condition is satisfied;
in response to the predetermined condition being satisfied, applying a perturbation action to obtain a perturbed routing solution and feeding the perturbed routing solution back to the RL model for the RL model to perform the applying one or more of the plurality of improvement actions according to the policy; and
determining a routing solution with a minimum cost from the updated routing solutions.

20. The storage medium of claim 19, wherein the plurality of improvement actions for applying to the state according to the policy to reduce the cost of the routing solution comprise one or more of the following:
changing an order of at least two of the plurality of locations in one of the one or more routes; and moving a location from one of the one or more routes to another one of the one or more routes.

* * * * *